(12) United States Patent
Tran et al.

(10) Patent No.: US 10,863,084 B2
(45) Date of Patent: Dec. 8, 2020

(54) VIDEO SMART PHONE

(71) Applicant: Bao Tran, Saratoga, CA (US)

(72) Inventors: Bao Tran, Saratoga, CA (US); Ha Tran, Saratoga, CA (US)

(*) Notice: Subject to any disclaimer, the term of this patent is extended or adjusted under 35 U.S.C. 154(b) by 0 days.

(21) Appl. No.: 16/207,157

(22) Filed: Dec. 2, 2018

(65) Prior Publication Data

US 2019/0116314 A1    Apr. 18, 2019

Related U.S. Application Data

(63) Continuation of application No. 15/144,797, filed on May 2, 2016, now Pat. No. 10,187,568.

(51) Int. Cl.
| | |
|---|---|
| *G06K 9/00* | (2006.01) |
| *H04N 5/232* | (2006.01) |
| *H04M 1/725* | (2006.01) |
| *H04N 5/225* | (2006.01) |
| *H04N 13/243* | (2018.01) |
| *H04N 5/247* | (2006.01) |
| *H04M 1/02* | (2006.01) |
| *H04N 13/296* | (2018.01) |
| *H04N 13/257* | (2018.01) |
| *H04N 13/194* | (2018.01) |

(52) U.S. Cl.
CPC ..... *H04N 5/23238* (2013.01); *G06K 9/00013* (2013.01); *G06K 9/00664* (2013.01); *H04M 1/0264* (2013.01); *H04M 1/7253* (2013.01); *H04N 5/2257* (2013.01); *H04N 5/247* (2013.01); *H04N 13/194* (2018.05); *H04N 13/243* (2018.05); *H04N 13/257* (2018.05); *H04N 13/296* (2018.05); *H04M 2250/52* (2013.01)

(58) Field of Classification Search
CPC ............ H04N 5/23238; H04N 13/194; H04N 13/257; H04N 13/296; H04N 5/247; H04N 13/243; H04N 5/2257; G06K 9/00664; G06K 9/00013; H04M 1/0264; H04M 1/7253; H04M 2250/52
See application file for complete search history.

(56) References Cited

U.S. PATENT DOCUMENTS

2016/0249038 A1* 8/2016 Mosleh ................. H04N 7/181

* cited by examiner

*Primary Examiner* — Nam D Pham
(74) *Attorney, Agent, or Firm* — Patent Law Office; Bao Tran

(57) ABSTRACT

A communication device includes a processor; a cellular transceiver coupled to the processor; an imager with multiple lens and multiple sensors therein to capture a 360 degree video; a plurality of graphic processing units to combine outputs from the sensors to form the 360 degree video, the processor and the graphic processing units operating to keep heat below a predetermined range.

19 Claims, 7 Drawing Sheets

VIDEO SMART PHONE

BACKGROUND

The present invention relates to a portable data-processing device.

Portable data processing devices such as cellular telephones have become ubiquitous due to the ease of use and the instant accessibility that the phones provide. For example, modern cellular phones provide calendar, contact, email, and Internet access functionalities that used to be provided by desktop computers. For providing typical telephone calling function, the cellular phone only needs a numerical keyboard and a small display. However, for advanced functionalities such as email or Internet access, full alphanumeric keyboards are desirable to enter text. Additionally, a large display is desirable for readability. However, such desirable features are at odds with the small size of the cellular phone.

Additionally, as the cellular phone takes over functions normally done by desktop computers, they carry sensitive data such as telephone directory, bank account and brokerage account information, credit card information, sensitive electronic mails (emails) and other personally identifiable information. The sensitive data needs to be properly secured. Yet, security and ease of use are requirements that are also at odds with each other.

SUMMARY

In one aspect, a smart phone has immersive video capture and/or display capability.

In one embodiment, a communication device includes a processor; a cellular transceiver coupled to the processor; an imager with multiple lens and multiple sensors therein to capture a 360 degree video; a plurality of graphic processing units to combine outputs from the sensors to form the 360 degree video; a fingerprint sensor to authenticate the video; and a non-contact payment unit coupled to the processor.

In another embodiment, a communication device includes a processor; a cellular transceiver coupled to the processor; an imager with multiple lens and multiple sensors therein to capture a 360 degree video; a plurality of graphic processing units to combine outputs from the sensors to form the 360 degree video, the processor and the graphic processing units operating to keep heat below a predetermined range; and a heat pipe coupled to the processor and the graphic processing units.

Advantages of the system may include one or more of the following. The system provides major improvements in terms of immersive video capture or display capabilities of mobile networks. The system supports high performance mobile communications and computing and offers consumers and enterprises mobile computing and communications anytime, anywhere and enables new revenue generating/productivity enhancement opportunities. Further, in addition to enabling access to data anytime and anywhere, the equipment is easier and cheaper to deploy than wired systems. Besides improving the overall capacity, the system's broadband wireless features create new demand and usage patterns, which will in turn, drive the development and continuous evolution of services and infrastructure.

BRIEF DESCRIPTION OF THE FIGURES

FIG. 5B shows exemplary placement of the multi-cameras, while

DESCRIPTION

Figure 1:
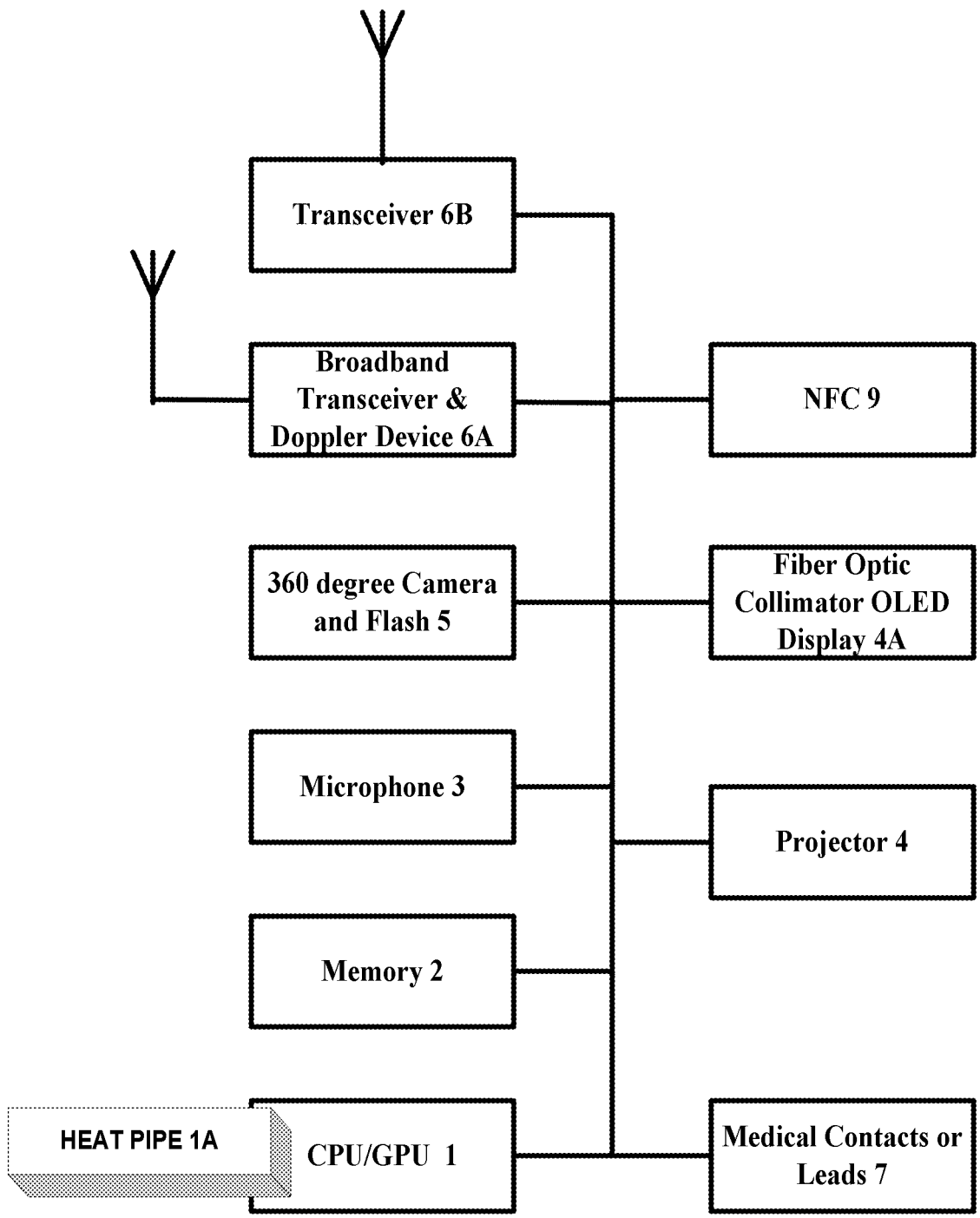
FIG. 1 shows an exemplary portable data processing device.

Now, the present invention is more specifically described with reference to accompanying drawings of various embodiments thereof, wherein similar constituent elements are designated by similar reference numerals.

FIG. 1 shows an exemplary portable data-processing device having enhanced I/O peripherals. In one embodiment, the device has a processor 1 connected to a memory array 2 that can also serve as a solid state disk. The processor 1 is also connected to a light projector 4, a microphone 3 and a 360 degree camera 5. A cellular transceiver 6A is connected to the processor 1 to access cellular network including data and voice. The cellular transceiver 6A can communicate with CDMA, GPRS, EDGE or 4G cellular networks. In addition, a broadcast transceiver 6B allows the device to receive satellite transmissions or terrestrial broadcast transmissions. The transceiver 6B supports voice or video transmissions as well as Internet access. Other alternative wireless transceiver can be used. For example, the wireless transceiver can be WiFi, WiMax, 802.X, Bluetooth, infrared, cellular transceiver all, one or more, or any combination thereof.

In one implementation, the transceiver 6B can receive XM Radio signals or Sirius signals. XM Radio broadcasts digital channels of music, news, sports and children's programming direct to cars and homes via satellite and a repeater network, which supplements the satellite signal to ensure seamless transmission. The channels originate from XM's broadcast center and uplink to satellites or high altitude planes or balloons acting as satellites. These satellites transmit the signal across the entire continental United States. Each satellite provides 18 kw of total power making them the two most powerful commercial satellites, providing coast-to-coast coverage. Sirius is similar with 3 satellites to transmit digital radio signals. Sirius's satellite audio broadcasting systems include orbital constellations for providing high elevation angle coverage of audio broadcast signals from the constellation's satellites to fixed and mobile receivers within service areas located at geographical latitudes well removed from the equator.

In one implementation, the transceiver 6B receives Internet protocol packets over the digital radio transmission and the processor enables the user to browse the Internet at high speed. The user, through the device, makes a request for Internet access and the request is sent to a satellite. The satellite sends signals to a network operations center (NOC) who retrieves the requested information and then sends the retrieved information to the device using the satellite.

In another implementation, the transceiver 6B can receive terrestrial Digital Audio Broadcasting (DAB) signal that offers high quality of broadcasting over conventional AM and FM analog signals. In-Band-On-Channel (IBOC) DAB is a digital broadcasting scheme in which analog AM or FM signals are simulcast along with the DAB signal The digital audio signal is generally compressed such that a minimum data rate is required to convey the audio information with sufficiently high fidelity. In addition to radio broadcasts, the terrestrial systems can also support internet access. In one implementation, the transceiver 6B can receive signals that are compatible with the Ibiquity protocol.

In yet another embodiment, the transceiver 6B can receive Digital Video Broadcast (DVB) which is a standard based upon MPEG-2 video and audio. DVB covers how MPEG-2 signals are transmitted via satellite, cable and terrestrial broadcast channels along with how such items as system information and the program guide are transmitted. In addition to DVB-S, the satellite format of DVB, the transceiver can also work with DVB-T which is DVB/MPEG-2 over terrestrial transmitters and DVB-H which uses a terrestrial broadcast network and an IP back channel. DVB-H operates at the UHF band and uses time slicing to reduce power consumption. The system can also work with Digital Multimedia Broadcast (DMB) as well as terrestrial DMB.

In yet another implementation, Digital Video Recorder (DVR) software can store video content for subsequent review. The DVR puts TV on the user's schedule so the user can watch the content at any time. The DVR provides the power to pause video and do own instant replays. The user can fast forward or rewind recorded programs.

In another embodiment, the device allows the user to view IPTV over the air. Wireless IPTV (Internet Protocol Television) allows a digital television service to be delivered to subscribing consumers using the Internet Protocol over a wireless broadband connection. Advantages of IPTV include two-way capability lacked by traditional TV distribution technologies, as well as point-to-point distribution allowing each viewer to view individual broadcasts. This enables stream control (pause, wind/rewind etc.) and a free selection of programming much like its narrowband cousin, the web. The wireless service is often provided in conjunction with Video on Demand and may also include Internet services such as Web access and VOIP telephony, and data access (Broadband Wireless Triple Play). A set-top box application software running on the processor 210 and through cellular or wireless broadband internet access, can receive IPTV video streamed to the handheld device.

IPT covers both live TV (multicasting) as well as stored video (Video on Demand VOD). Video content can be MPEG protocol. In one embodiment, MPEG2TS is delivered via IP Multicast. In another IPTV embodiment, the underlying protocols used for IPTV are IGMP version 2 for channel change signaling for live TV and RTSP for Video on Demand. In yet another embodiment, video is streamed using the H.264 protocol in lieu of the MPEG-2 protocol. H.264, or MPEG-4 Part 10, is a digital video codec standard, which is noted for achieving very high data compression. It was written by the ITU-T Video Coding Experts Group (VCEG) together with the ISO/IEC Moving Picture Experts Group (MPEG) as the product of a collective partnership effort known as the Joint Video Team (JVT). The ITU-T H.264 standard and the ISO/IEC MPEG-4 Part 10 standard (formally, ISO/IEC 14496-10) are technically identical, and the technology is also known as AVC, for Advanced Video Coding. H.264 is a name related to the ITU-T line of H.26x video standards, while AVC relates to the ISO/IEC MPEG side of the partnership project that completed the work on the standard, after earlier development done in the ITU-T as a project called H.26L. It is usual to call the standard as H.264/AVC (or AVC/H.264 or H.264/MPEG-4 AVC or MPEG-4/H.264 AVC) to emphasize the common heritage. H.264/AVC/MPEG-4 Part10 contains features that allow it to compress video much more effectively than older standards and to provide more flexibility for application to a wide variety of network environments. H.264 can often perform radically better than MPEG-2 video—typically obtaining the same quality at half of the bit rate or less. Similar to MPEG-2, H.264/AVC requires encoding and decoding technology to prepare the video signal for transmission and then on the screen 230 or substitute screens (STB and TV/monitor, or PC). H.264/AVC can use transport technologies compatible with MPEG-2, simplifying an upgrade from MPEG-2 to H.264/AVC, while enabling transport over TCP/IP and wireless. H.264/AVC does not require the expensive, often proprietary encoding and decoding hardware that MPEG-2 depends on, making it faster and easier to deploy H.264/AVC solutions using standards-based processing systems, servers, and STBs. This also allows service providers to deliver content to devices for which MPEG-2 cannot be used, such as PDA and digital cell phones.

The H.264/AVC encoder system in the main office turns the raw video signals received from content providers into H.264/AVC video streams. The streams can be captured and stored on a video server at the headend, or sent to a video server at a regional or central office (CO), for video-on-demand services. The video data can also be sent as live programming over the network. Standard networking and switching equipment routes the video stream, encapsulating the stream in standard network transport protocols, such as ATM. A special part of H.264/AVC, called the Network Abstraction Layer (NAL), enables encapsulation of the stream for transmission over a TCP/IP network. When the video data reaches the handheld device through the transceiver 6B, the application software decodes the data using a plug-in for the client's video player (Real Player and Windows Media Player, among others).

In addition to the operating system and user selected applications, another application, a VOIP phone application executes on the processing unit or processor 1. Phone calls from the Internet directed toward the mobile device are detected by the mobile radio device and sent, in the form of an incoming call notification, to the phone device (executing on the processing unit 1). The phone device processes the incoming call notification by notifying the user by an audio output such as ringing. The user can answer the incoming call by tapping on a phone icon, or pressing a hard button designated or preprogrammed for answering a call. Outgoing calls are placed by a user by entering digits of the number to be dialed and pressing a call icon, for example. The dialed digits are sent to the mobile radio device along with instructions needed to configure the mobile radio device for an outgoing call using either the cellular transceiver 6A or the wireless broadcast transceiver 6B. If the call is occurring while the user is running another application such as video viewing, the other application is suspended until the call is completed. Alternatively, the user can view the video in mute mode while answering or making the phone call.

The light projector 4 includes a light source such as a white light emitting diode (LED) or a semiconductor laser device or an incandescent lamp emitting a beam of light through a focusing lens to be projected onto a viewing screen. The beam of light can reflect or go through an image forming device such as a liquid crystal display (LCD) so that the light source beams light through the LCD to be projected onto a viewing screen.

Alternatively, the light projector 4 can be a MEMS device. In one implementation, the MEMS device can be a digital micro-mirror device (DMD) available from Texas Instruments, Inc., among others. The DMD includes a large number of micro-mirrors arranged in a matrix on a silicon substrate, each micro-mirror being substantially of square having a side of about 16 microns.

Another MEMS device is the grating light valve (GLV). The GLV device consists of tiny reflective ribbons mounted over a silicon chip. The ribbons are suspended over the chip with a small air gap in between. When voltage is applied below a ribbon, the ribbon moves toward the chip by a fraction of the wavelength of the illuminating light and the deformed ribbons form a diffraction grating, and the various orders of light can be combined to form the pixel of an image. The GLV pixels are arranged in a vertical line that can be 1,080 pixels long, for example. Light from three lasers, one red, one green and one blue, shines on the GLV and is rapidly scanned across the display screen at a number of frames per second to form the image.

In one implementation, the light projector 4 and the camera 5 face opposite surfaces so that the camera 5 faces the user to capture user finger strokes during typing while the projector 4 projects a user interface responsive to the entry of data. In another implementation, the light projector 4 and the camera 5 on positioned on the same surface. In yet another implementation, the light projector 4 can provide light as a flash for the camera 5 in low light situations.

In one embodiment, the camera 5 has two F/2.0 fish-eye lenses, with a 15-megapixel sensor on each and can capture 3,840×1,920 video at 60 frames per second and still images at a 7,776×3,888 resolution (30 megapixels). The content can be stored on a microSD card slot that can accommodate up to 512 GB of storage.

The unit also includes a heat pipe 1A. Adding a heat-pipe to a smartphone improves the device's ability to cool down. One embodiment uses graphite in combination with a phone's metal chassis to keep a phone from overheating. Other handsets use software to throttle the CPU when the phone gets too hot. Another embodiment uses an evaporator coupled to the chip that evaporates liquid in the heat pipe to cool the chip and the condensed vapor is returned to the chamber to be evaporated/boiled to cool the chips.

The device may optionally have an OLED display 4A. Embodiments of the present invention provide a head-mounted device for see-through imaging. In this type of device, the viewer sees the outside or "real-world" scene content and, visually superimposed upon that scene content, an electronically generated image. Design of such devices places considerable constraints on how electronically generated images are formed and displayed, since the view of the external scene must not be obstructed. The system provides a virtual image using a display such as an OLED or other emissive display device or, alternately, using a transmissive display device that has an external light source. The description that follows is directed primarily to OLED and similar emissive devices which are advantaged for smaller size and packaging considerations. However, it should be noted that other display types could alternately be used. A real image refers to an image that can be observed directly by the unaided human eye. By contrast to real image displays, virtual image displays provide an image that is not observable on a viewing surface. The virtual image is formed at a location in space where no display surface exists. A classic example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image electronic displays thus have the advantage of eliminating the need for a large display surface in order to produce a large electronic image. More details are disclosed in U.S. Ser. No. 61/216,109, provisionally filed on May 13, 2009, entitled "An Optical Device Using an OLED Display Device", the content of which is incorporated by reference.

Figure 2:
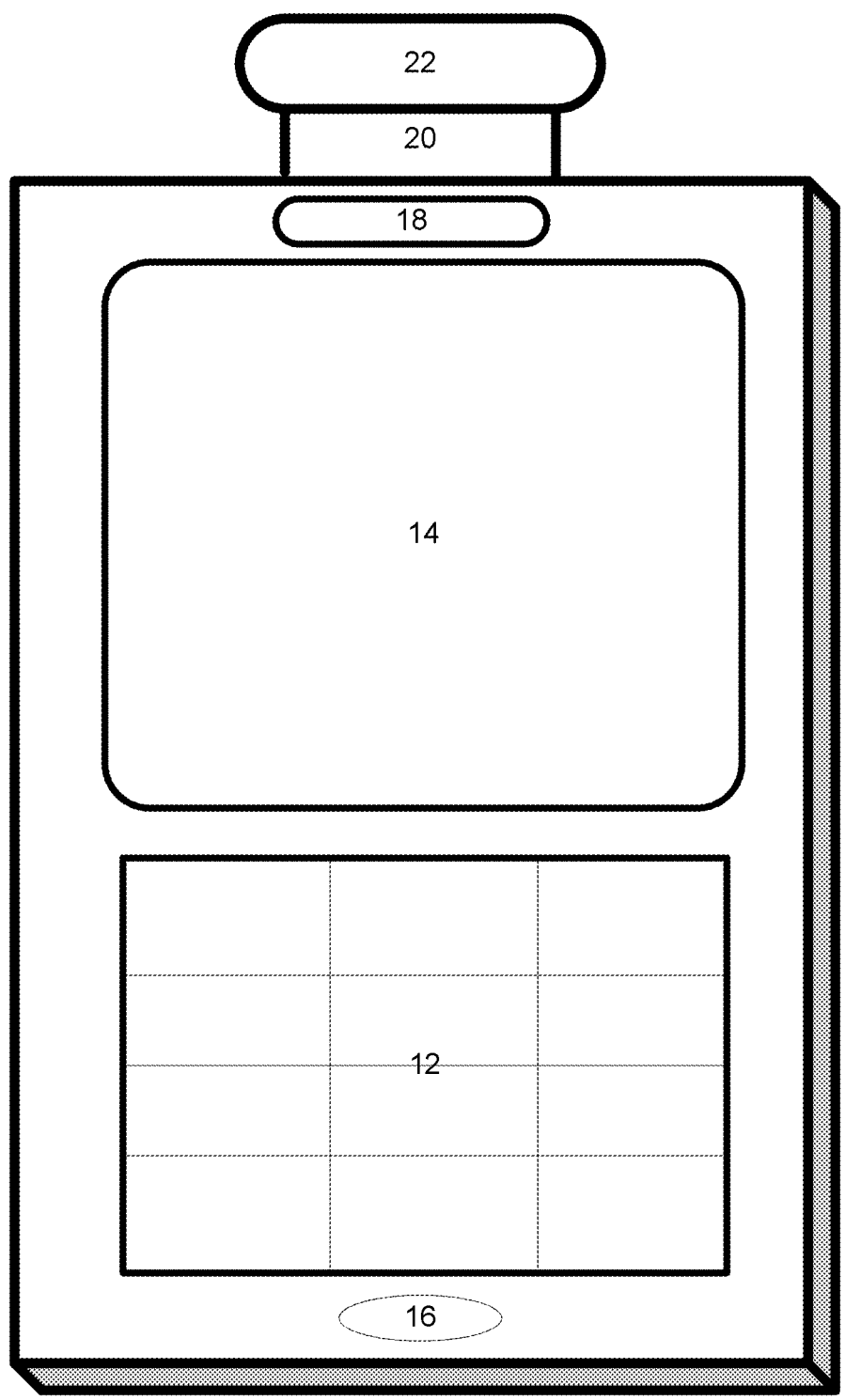
FIG. 2 shows an exemplary dual head camera for taking 360 degree views with the device of FIG. 1.
Figure 3:
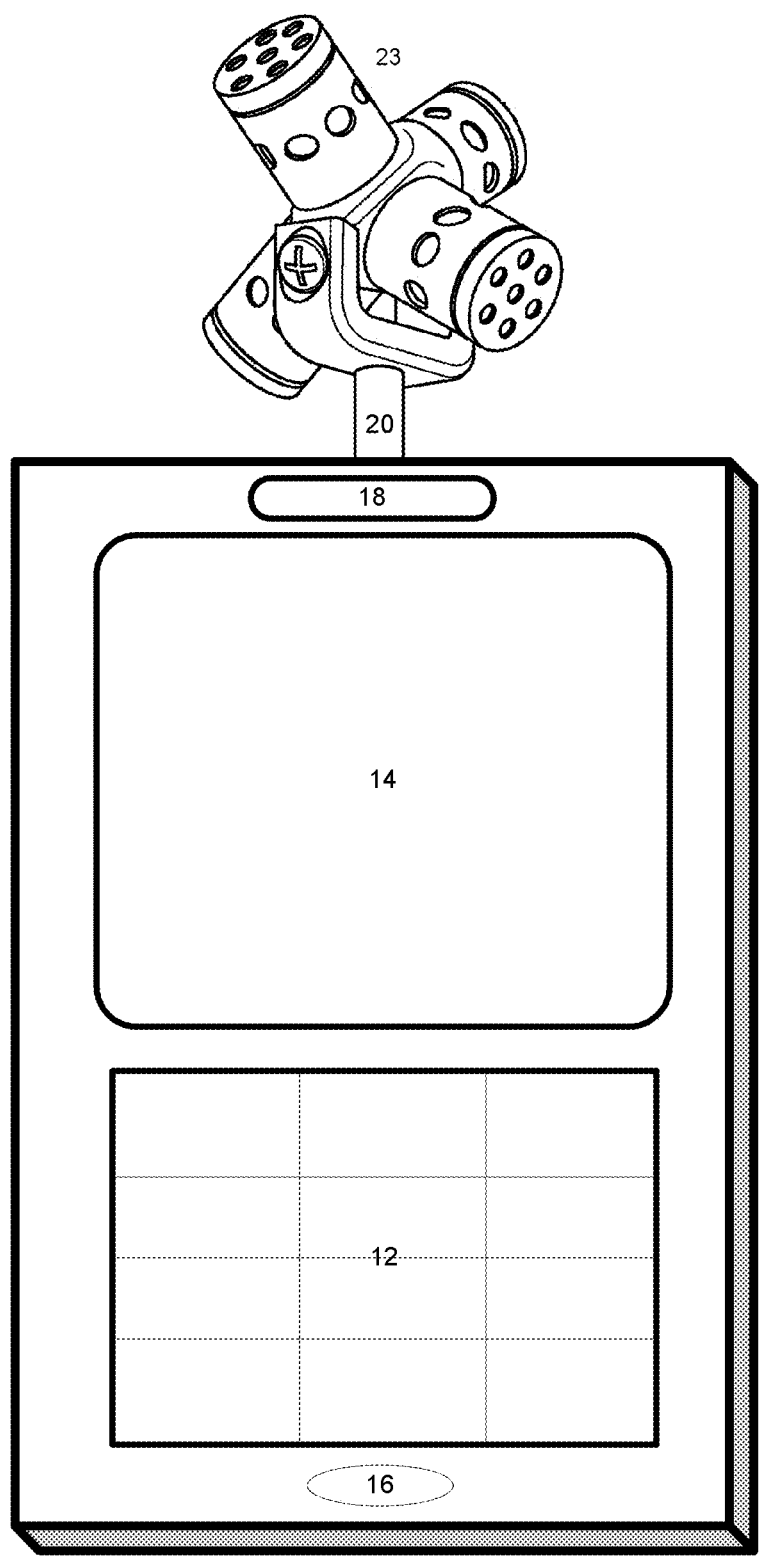
FIG. 3 shows an exemplary multi-headed camera cellular telephone embodiment.

FIG. 2 shows one embodiment where the portable computer is implemented as a cellular phone 10. In FIG. 3, the cellular phone 10 has numeric keypad 12, a phone display 14, a microphone port 16, a speaker port 18. The phone 10 has a housing 22 with dual camera lenses with camera sensors thereon (one on each side), the camera 5 is mounted on the swivel base or rotatable support 20 to allow the heads to be swiveled by the user to adjust the display angle, for example. During operation, a complete 360 degree view is captured for virtual reality, for example. The resulting video can be edited and uploaded to cloud storage such as youtube.com for sharing, among others.

The light-camera can also be have a camera flash unit. In this capacity, the camera samples the room lighting condition. When it detects a low light condition, the processor determines the amount of flash light needed. When the camera actually takes the picture, the flash beams the required flash light to better illuminate the room and the subject.

FIG. 3 shows a multi-head embodiment of FIG. 2 with a multi-headed camera array 23 that may be at least part of a modular camera system, with each camera forming a module of the modular camera system. The camera array has a flexible structure so that it is easy to remove a particular camera module from the camera array and to add new camera modules to the camera array. The camera modules in the camera array may be configured in different geometries. For example, the camera array includes multiple camera modules arranged in a line, a cylinder, a sphere, or another geometry. Each camera module may be configured to point to a different direction so that the camera array may capture an object or a scene from multiple directions at the same time.

The camera system described herein may additionally include a set of algorithms for processing the video data captured by the camera array. The set of algorithms are stored on a non-transitory memory for converting the input across multiple camera modules into a single stream of 3D video (e.g., a single compressed stream of 3D video data). The set of algorithms may be implemented in one or more "modules". For example, the set of algorithms includes color correction algorithms for smoothing and correcting colors in the video data. In another example, the set of algorithms may be implemented in software that stitches the video data from multiple cameras into two large-format, panoramic video streams for left and right eye viewing, and encodes and compresses the video using a standard MPEG format or other suitable encoding/compression format.

The camera array 23 may be constructed using various configurations. For example, the camera modules may be configured in different geometries (e.g., a sphere, a line, a cylinder, a cone, a cube, etc.) with the corresponding lenses 113 facing in different directions. For example, the camera modules are positioned within the camera array 23 in a honeycomb pattern where each of the compartments form an aperture where a camera module may be inserted. In another example, the camera array 23 includes multiple lenses along a horizontal axis and a smaller number of lenses on a vertical axis.

In some embodiments, the camera modules in the camera array 23 are oriented around a sphere in different directions with sufficient diameter and field-of-view to capture enough view disparity to render stereoscopic images.

The camera array 23 has a flexible structure so that a particular camera module may be removed from the camera array 23 easily. In some embodiments, the camera modules are rotationally symmetrical such that a camera module may be inserted into the housing, removed, rotated 90 degrees, and reinserted into the housing. In this example, the sides of the housing may be equidistant, such as a camera module with four equidistant sides. This allows for a landscape orientation or a portrait orientation of the image frames without changing the base. In some embodiments, the lenses 113 and the camera modules are interchangeable. New camera modules may also be added to the camera array 23. In some embodiments, the camera modules in the camera array 23 are positioned to have a sufficient field-of-view overlap so that all objects can be seen by more than one view point. In some embodiments, having the camera array 23 configured so that an object may be viewed by more than one camera may be beneficial for correcting exposure or color deficiencies in the images captured by the camera array 23. Other benefits include disparity/depth calculations, stereoscopic reconstruction, and the potential to perform multi-camera high-dynamic range (HDR) imaging using an alternating mosaic pattern of under- and over-exposure across the camera array.

In some embodiments, the camera array 23 may also include a microphone array for capturing sound from all directions. For example, the microphone array may include a Core Sound Tetramic soundfield tetrahedral microphone array following the principles of ambisonics, enabling reconstruction of sound from any arbitrary direction. In another example, the microphone array includes the Eigenmike, which advantageously includes a greater number of microphones and, as a result, can perform higher-order (i.e. more spatially accurate) ambisonics. The microphone may be mounted to the top of the camera array 23, be positioned between camera modules, or be positioned within the body of the camera array 23.

The phone can run apps or software including routines for generating 3D video, synthesizing audio data, and generating a stream of 3D video and audio data.

The surround video module may generate the 3D video data based on the raw video data received from the camera modules. For example, the surround video module may stitch the image frames together based on a frame sync signal in the video and by using audio tracks from a mounted microphone and/or microphones in each camera module to time-align audio tracks from the microphones. In some embodiments, the stitching is also based on the geometric calibration. The surround video module may include a stitching algorithm for stitching images captured by the camera modules together to form a 3D panorama described by the 3D video data. For example, the video module 208 may stitch the raw video data from multiple cameras into two large-format, panoramic video streams for left and right eye viewing.

The surround video module receives audio from multiple microphones and synthesizes audio based on timing associated with the audio tracks to generate 3D audio data that changes based on the user's head position. In some embodiments, the surround video module mixes audio from a 3D ambisonic microphone with spot microphones to create fully spatialized sound effects. The surround video module generates binaural audio. In some embodiments, the surround video module uses a head-related transfer function to generate real-time binaural audio. In some embodiments, the audio is compatible with Dolby® Atmos™. In some embodiments, the surround video module generates a stream of 3D and audio data for displaying panoramic images.

In some embodiments, the surround video module may construct a stereoscopic panorama using images from multiple views from different directions. For example, the camera array 23 includes multiple camera modules with multiple lenses 113 arranged around all three hundred and sixty degrees of a sphere. The lenses each point in different directions. Because the camera modules are arranged around three hundred and sixty degrees of a sphere and taking images of the scene from multiple viewpoints, the video data includes multiple views from different directions. The resulting panoramic image is a spherical representation of the scene. Each pixel in the panorama may represent a view in a slightly different direction relative to neighboring pixels.

In some embodiments, the surround video module generates the stereoscopic panorama based on the location of the camera modules. For example, where the camera modules are daisy chained to each other and the master camera module instructs the other camera modules to start recording, the surround video module uses the timestamp associated with the recordings to construct the stereoscopic panorama.

The correction module can be software including routines for detecting and correction exposure or color deficiencies in the images captured by the camera modules. In some embodiments, the correction module can be a set of instructions to provide the functionality described below for detecting and correction exposure or color deficiencies in the images captured by the camera modules.

For example, because the lenses 113 of the camera modules are pointing in different directions, the lighting and color conditions may vary dramatically. If all the lenses 113 of the camera modules are configured identically some images may be under or over exposed. The correction module 210 may detect the exposure or color deficiencies. The correction module 210 may determine one or more pixels associated with the exposure or color deficiencies. The correction module 210 may determine the pixel values associated with these pixels and then modify the pixel values so that the exposure or color deficiencies are not detectable by a user during consumption of the 3D video content using a client device. In some embodiments, the camera modules have overlapping fields of view and, exposure or color deficiencies in the images captured by the camera modules can be corrected or auto-corrected using this overlap. In other embodiments, exposure or color deficiencies in the images captured by the camera modules can be corrected using calibration based on color charts of known values.

Figure 4:
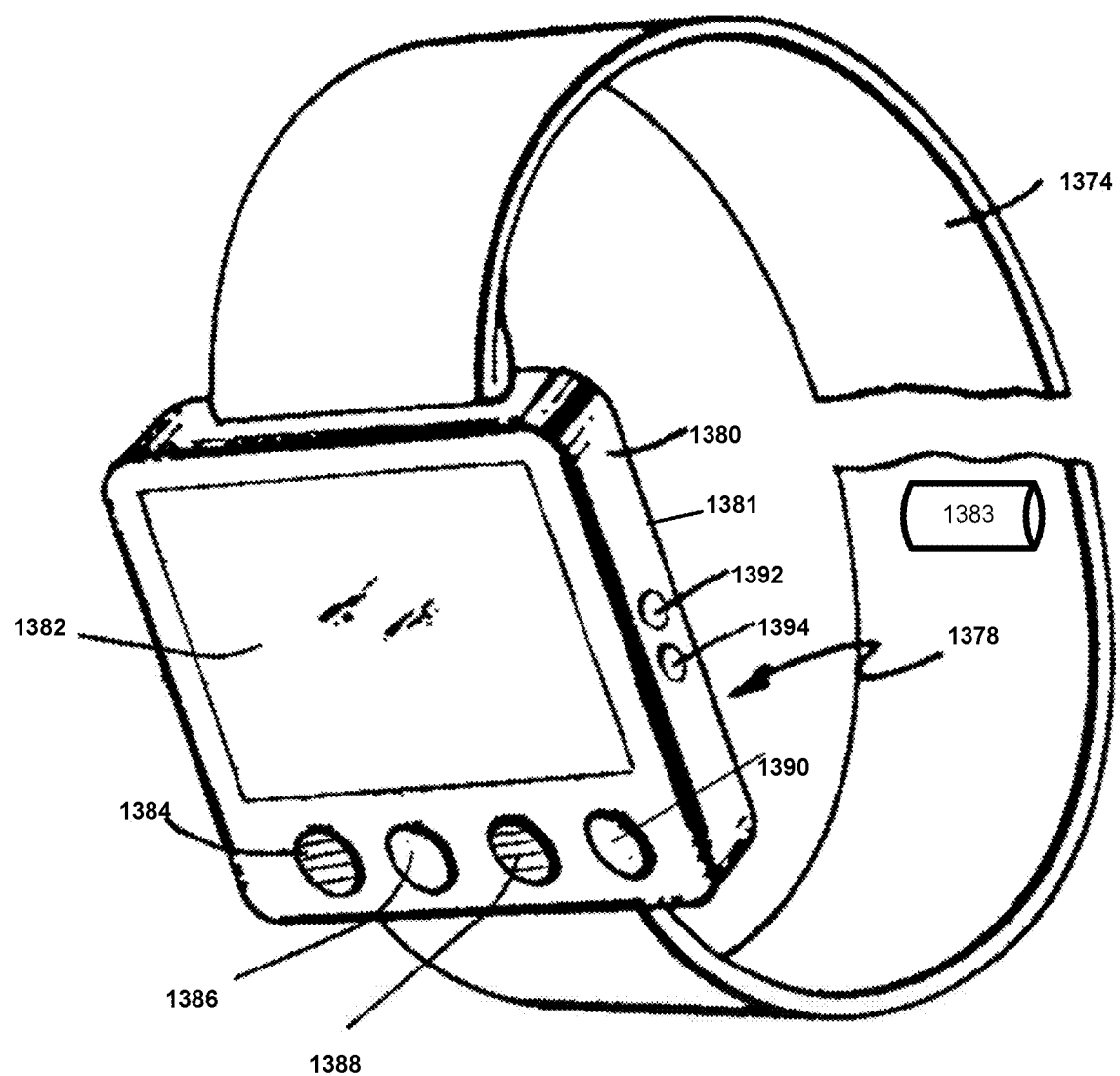
FIG. 4 shows a wearable appliance for monitoring video capture and communicating with the phone.

Referring now to FIG. 4, an example of a method 400 for providing video data using the camera array 23 is described, in accordance with at least one embodiment described herein. The method 400 is described with respect to FIGS. 1 and 2. Although illustrated as discrete blocks, various blocks may be divided into additional blocks, combined into fewer blocks, or eliminated, depending on the desired implementation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The surround video module receives video data comprising image frames from the camera modules. The surround video module stitches 410 the image frames together based on the video data, generates 3D video, synthesizes audio data, and generates a stream of the 3D video and the audio data for displaying panoramic images. In some embodiments, the surround video module stitches the image frames together from each of the camera modules based on a timestamp associated with each of the frames.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the relative position is determined from an independently performed geometric calibration. In other embodiments, the calibration module performs geometric calibration after the video is recorded using the video content. For example, the surround video module uses the relative position of each camera module in combination with a stitching algorithm to perform the stitching. The surround video module generates 3D video data. The surround video module synthesizes audio data. For example, the surround video module uses the audio from four different microphones to create audio that is adjusted depending on the angle of the user's head during the virtual reality experience. The surround video module generates a stream of 3D video and audio data for displaying panoramic images.

In one embodiment, the phone 10 has a projection head that projects the user interface on a screen. During operation, light from a light source internal to the phone 10 drives the head that displays a screen for the user to view the output of processor 1. The head projects the user interface through a focusing lens and through an LCD to project the user interface rendered by the LCD onto a first surface such as a display screen surface.

In one embodiment, the head 26 displays a screen display region 30 in one part of the projected image and a keyboard region 32 in another part of the projected image. In this embodiment, the screen and keyboard are displayed on the same surface. During operation, the head 26 projects the user interface and the keyboard template onto the same surface such as a table surface to provide the user with a virtual keyboard to "type" on. Additionally, any part of the projected image can be "touch sensitive" in that when the user touches a particular area, the camera registers the touching and can respond to the selection as programmatically desired. This embodiment provides a virtual touch screen where the touch-sensitive panel has a plurality of unspecified key-input locations.

When user wishes to input some data on the touch-sensitive virtual touch screen, the user determines a specific angle between the cell phone to allow the image projector 24 or 26 to project a keyboard image onto a surface. The keyboard image projected on the surface includes an image of arrangement of the keypads for inputting numerals and symbols, images of pictures, letters and simple sentences in association with the keypads, including labels and/or specific functions of the keypads. The projected keyboard image is switched based on the mode of the input operation, such as a numeral, symbol or letter input mode. The user touches the location of a keypad in the projected image of the keyboard based on the label corresponding to a desired function. The surface of the touch-sensitive virtual touch screen for the projected image can have a color or surface treatment which allows the user to clearly observe the projected image. In an alternative, the touch-sensitive touch screen has a plurality of specified key-input locations such as obtained by printing the shapes of the keypads on the front surface. In this case, the keyboard image includes only a label projected on each specified location for indicating the function of the each specified location.

The virtual keyboard and display projected by the light projector are ideal for working with complex documents. Since these documents are typically provided in Word, Excel, PowerPoint, or Acrobat files, among others, the processor can also perform file conversion for one of: Outlook, Word, Excel, PowerPoint, Access, Acrobat, Photoshop, Visio, AutoCAD, among others.

Since high performance portable data devices can critical sensitive data, authentication enables the user to safely carry or transmit/receive sensitive data with minimal fear of compromising the data. The processor 1 can authenticate a user using one of: retina image captured by a camera, face image captured by the camera, and voice characteristics captured by a microphone.

In one embodiment, the processor 1 captures an image of the user's eye. The rounded eye is mapped from a round shape into a rectangular shape, and the rectangular shape is then compared against a prior mapped image of the retina.

In yet another embodiment, the user's face is captured and analyzed. Distinguishing features or landmarks are determined and then compared against prior stored facial data for authenticating the user. Examples of distinguishing land include the distance between ears, eyes, the size of the mouth, the shape of the mouth, the shape of the eyebrow, and any other distinguishing features such as scars and pimples, among others.

In yet another embodiment, the user's voice is recognized by a trained speaker dependent voice recognizer. Authentication is further enhanced by asking the user to dictate a verbal password.

To provide high security for bank transactions or credit transactions, a plurality of the above recognition techniques can be applied together. Hence, the system can perform retinal scan, facial scan, and voice scan to provide a high level of confidence that the person using the portable computing device is the real user.

Once digitized by the microphone and the camera, various algorithms can be applied to detect a pattern associated with a person. The signal is parameterized into features by a feature extractor. The output of the feature extractor is delivered to a sub-structure recognizer. A structure preselector receives the prospective sub-structures from the recognizer and consults a dictionary to generate structure candidates. A syntax checker receives the structure candidates and selects the best candidate as being representative of the person.

In one embodiment, a neural network is used to recognize each code structure in the codebook as the neural network is quite robust at recognizing code structure patterns. Once the speech or image features have been characterized, the speech or image recognizer then compares the input speech or image signals with the stored templates of the vocabulary known by the recognizer.

Data from the vector quantizer is presented to one or more recognition models, including an HMM model, a dynamic time warping model, a neural network, a fuzzy logic, or a template matcher, among others. These models may be used singly or in combination. The output from the models is presented to an initial N-gram generator which groups N-number of outputs together and generates a plurality of confusingly similar candidates as initial N-gram prospects. Next, an inner N-gram generator generates one or more N-grams from the next group of outputs and appends the inner trigrams to the outputs generated from the initial N-gram generator. The combined N-grams are indexed into a dictionary to determine the most likely candidates using a candidate preselector. The output from the candidate preselector is presented to a speech or image structure N-gram model or a speech or image grammar model, among others to select the most likely speech or image structure based on the occurrences of other speech or image structures nearby.

Dynamic programming obtains a relatively optimal time alignment between the speech or image structure to be recognized and the nodes of each speech or image model. In addition, since dynamic programming scores speech or image structures as a function of the fit between speech or image models and the speech or image signal over many frames, it usually gives the correct speech or image structure the best score, even if the speech or image structure has been slightly misspoken or obscured by background sound. This is important, because humans often mispronounce speech or image structures either by deleting or mispronouncing proper sounds, or by inserting sounds which do not belong.

In dynamic time warping, the input speech or image signal A, defined as the sampled time values $A=a(1) \ldots a(n)$, and the vocabulary candidate B, defined as the sampled time values $B=b(1) \ldots b(n)$, are matched up to minimize the discrepancy in each matched pair of samples. Computing the warping function can be viewed as the process of finding the minimum cost path from the beginning to the end of the speech or image structures, where the cost is a function of the discrepancy between the corresponding points of the two speech or image structures to be compared.

The warping function can be defined to be:

$$C=c(1),c(2),\ldots,c(k),\ldots c(K)$$

where each c is a pair of pointers to the samples being matched:

$$c(k)=[i(k),j(k)]$$

In this case, values for A are mapped into i, while B values are mapped into j. For each c(k), a cost function is computed between the paired samples. The cost function is defined to be:

$$d[c(k)]=(ai(k)-bj(k))2$$

The warping function minimizes the overall cost function:

$$D(C)=\Sigma k=1 K d[c(k)]$$

subject to the constraints that the function must be monotonic $$i(k) \geq i(k-1) \text{ and } j(k) \geq j(k-1)$$

and that the endpoints of A and B must be aligned with each other, and that the function must not skip any points.

Dynamic programming considers all possible points within the permitted domain for each value of i. Because the best path from the current point to the next point is independent of what happens beyond that point. Thus, the total cost of [i(k), j(k)] is the cost of the point itself plus the cost of the minimum path to it. Preferably, the values of the predecessors can be kept in an M×N array, and the accumulated cost kept in a 2×N array to contain the accumulated costs of the immediately preceding column and the current column. However, this method requires significant computing resources.

The method of whole-speech or image structure template matching has been extended to deal with connected speech or image structure recognition. A two-pass dynamic programming algorithm to find a sequence of speech or image structure templates which best matches the whole input pattern. In the first pass, a score is generated which indicates the similarity between every template matched against every possible portion of the input pattern. In the second pass, the score is used to find the best sequence of templates corresponding to the whole input pattern.

Considered to be a generalization of dynamic programming, a hidden Markov model is used in the preferred embodiment to evaluate the probability of occurrence of a sequence of observations $O(1), O(2), \ldots O(t), \ldots, O(T)$, where each observation O(t) may be either a discrete symbol under the VQ approach or a continuous vector. The sequence of observations may be modeled as a probabilistic function of an underlying Markov chain having state transitions that are not directly observable.

In the preferred embodiment, the Markov network is used to model a number of speech or image sub-structures. The transitions between states are represented by a transition matrix $A=[a(i,j)]$. Each a(ij) term of the transition matrix is the probability of making a transition to state j given that the model is in state i. The output symbol probability of the model is represented by a set of functions $B=[b(j) (O(t)]$, where the b(j) (O(t) term of the output symbol matrix is the probability of outputting observation O(t), given that the model is in state j. The first state is always constrained to be the initial state for the first time frame of the utterance, as only a prescribed set of left-to-right state transitions are possible. A predetermined final state is defined from which transitions to other states cannot occur.

Transitions are restricted to reentry of a state or entry to one of the next two states. Such transitions are defined in the model as transition probabilities. For example, a speech or image signal pattern currently having a frame of feature signals in state 2 has a probability of reentering state 2 of a(2,2), a probability a(2,3) of entering state 3 and a probability of $a(2,4)=1-a(2,1)-a(2,2)$ of entering state 4. The probability a(2,1) of entering state 1 or the probability a(2,5) of entering state 5 is zero and the sum of the probabilities a(2,1) through a(2,5) is one. Although the preferred embodiment restricts the flow graphs to the present state or to the next two states, one skilled in the art can build an HMM model without any transition restrictions, although the sum of all the probabilities of transitioning from any state must still add up to one.

In each state of the model, the current feature frame may be identified with one of a set of predefined output symbols or may be labeled probabilistically. In this case, the output symbol probability b(j) O(t) corresponds to the probability assigned by the model that the feature frame symbol is O(t). The model arrangement is a matrix $A=[a(i,j)]$ of transition probabilities and a technique of computing $B=b(j) O(t)$, the feature frame symbol probability in state j.

The probability density of the feature vector series $Y=y(1), \ldots, y(T)$ given the state series $X=x(1), \ldots, x(T)$ is

[Precise Solution]$L1(v)=\Sigma x P\{Y,X|\lambda,v\}$

[Approximate Solution]$L2(v)=\max x[P\{Y,X|\lambda,v\}]$

[Log Approximate Solution]$L3(v)=\max x[\log P\{Y,X|\lambda,v\}]$

The final recognition result v of the input speech or image signal x is given by: where n is a positive integer. v=argmax v [Ln (v)]

The Markov model is formed for a reference pattern from a plurality of sequences of training patterns and the output symbol probabilities are multivariate Gaussian function probability densities. The speech or image signal traverses through the feature extractor. During learning, the resulting feature vector series is processed by a parameter estimator, whose output is provided to the hidden Markov model. The hidden Markov model is used to derive a set of reference pattern templates, each template representative of an identified pattern in a vocabulary set of reference speech or image sub-structure patterns. The Markov model reference templates are next utilized to classify a sequence of observations into one of the reference patterns based on the probability of generating the observations from each Markov model reference pattern template. During recognition, the unknown pattern can then be identified as the reference pattern with the highest probability in the likelihood calculator.

The HMM template has a number of states, each having a discrete value. However, because speech or image signal features may have a dynamic pattern in contrast to a single value. The addition of a neural network at the front end of the HMM in an embodiment provides the capability of representing states with dynamic values. The input layer of the neural network comprises input neurons. The outputs of the input layer are distributed to all neurons in the middle layer. Similarly, the outputs of the middle layer are distributed to all output states, which normally would be the output layer of the neuron. However, each output has transition probabilities to itself or to the next outputs, thus forming a modified HMM. Each state of the thus formed HMM is capable of responding to a particular dynamic signal, resulting in a more robust HMM. Alternatively, the neural network can be used alone without resorting to the transition probabilities of the MINI architecture.

Although the neural network, fizzy logic, and HMM structures described above are software implementations, nano-structures that provide the same functionality can be used. For instance, the neural network can be implemented as an array of adjustable resistance whose outputs are summed by an analog summer.

The light projector 4 includes a light source such as a white light emitting diode (LED) or a semiconductor laser device or an incandescent lamp emitting a beam of light through a focusing lens to be projected onto a viewing screen. The beam of light can reflect or go through an image forming device such as a liquid crystal display (LCD) so that the light source beams light through the LCD to be projected onto a viewing screen. Alternatively, the light projector 4 can be a MEMS device. In one implementation, the MEMS device can be a digital micro-mirror device (DMD) available from Texas Instruments, Inc., among others. The DMD includes a large number of micro-mirrors arranged in a matrix on a silicon substrate, each micro-mirror being substantially of square having a side of about 16 microns.

Another MEMS device is the grating light valve (GLV). The GLV device consists of tiny reflective ribbons mounted over a silicon chip. The ribbons are suspended over the chip with a small air gap in between. When voltage is applied below a ribbon, the ribbon moves toward the chip by a fraction of the wavelength of the illuminating light and the deformed ribbons form a diffraction grating, and the various orders of light can be combined to form the pixel of an image. The GLV pixels are arranged in a vertical line that can be 1,080 pixels long, for example. Light from three lasers, one red, one green and one blue, shines on the GLV and is rapidly scanned across the display screen at a number of frames per second to form the image.

One embodiment of the light projector is a 3D projector. In this embodiment, the projector 4 uses circular polarization—produced by a filter in front of the projector 4—to beam the film onto a screen (preferably silver screen). The filter converts linearly polarized light into circularly polarized light by slowing down one component of the electric field. When the vertical and horizontal parts of the picture are projected onto the silver screen, the filter slows down the vertical component. This effectively makes the light appear to rotate to create a 3D telepresence capability.

Another embodiment is a plurality of projectors 4 on the mobile device that forms a holographic projector. To create the hologram, cameras take color images at multiple angles and send them over the network. In one embodiment, images from the projectors 4 are projected onto a transparent plastic panel and refreshed every few seconds. In another embodiment, the phone is positioned flat on a table and the system creates an optical illusion that the image is floating above the screen. Preferably four to six projectors are used to form the holographic phone.

In one implementation, the light projector 4 and the camera 5 face opposite surfaces so that the camera 5 faces the user to capture user finger strokes during typing while the projector 4 projects a user interface responsive to the entry of data. In another implementation, the light projector 4 and the camera 5 on positioned on the same surface. In yet another implementation, the light projector 4 can provide light as a flash for the camera 5 in low light situations. The process projects a keyboard pattern onto a first surface using the light projector. The camera 5 is used to capture images of user's digits on the keyboard pattern as the user types and digital images of the typing is decoded by the processor 1 to determine the character being typed. The processor 1 then displays typed character on a second surface with the light projector. During operation, one head projects the user interface on a screen, while the other head displays a keyboard template onto a surface such as a table surface to provide the user with a virtual keyboard to "type" on. During operation, light from a light source internal to the phone 10 drives the heads. One head displays a screen for the user to view the output of processor 1, while the remaining head displays in an opposite direction the virtual keyboard using a predefined keyboard template. During operation, light from a light source internal to the phone drives the heads. The head displays a screen for the user to view the output of processor 1, while the second head displays in an opposite direction the virtual keyboard using a predefined keyboard template. The first head projects the user interface on a first surface such as a display screen surface, while the second head displays a keyboard template onto a different surface such as a table surface to provide the user with a virtual keyboard to "type" on.

The light-projector can also be used as a camera flash unit. In this capacity, the camera samples the room lighting condition. When it detects a low light condition, the processor determines the amount of flash light needed. When the camera actually takes the picture, the light projector beams the required flash light to better illuminate the room and the subject. In one embodiment, the head displays a screen display region in one part of the projected image and a keyboard region in another part of the projected image. In this embodiment, the screen and keyboard are displayed on the same surface. During operation, the head projects the user interface and the keyboard template onto the same surface such as a table surface to provide the user with a virtual keyboard to "type" on. Additionally, any part of the projected image can be "touch sensitive" in that when the user touches a particular area, the camera registers the touching and can respond to the selection as programmatically desired. This embodiment provides a virtual touch screen where the touch-sensitive panel has a plurality of unspecified key-input locations. When user wishes to input some data on the touch-sensitive virtual touch screen, the user determines a specific angle between the cell phone to allow the image projector to project a keyboard image onto a surface. The keyboard image projected on the surface includes an image of arrangement of the keypads for inputting numerals and symbols, images of pictures, letters and simple sentences in association with the keypads, including labels and/or specific functions of the keypads. The projected keyboard image is switched based on the mode of the input operation, such as a numeral, symbol or letter input mode. The user touches the location of a keypad in the projected image of the keyboard based on the label corresponding to a desired function. The surface of the touch-sensitive virtual touch screen for the projected image can have a color or surface treatment which allows the user to clearly observe the projected image. In an alternative, the touch-sensitive touch screen has a plurality of specified key-input locations such as obtained by printing the shapes of the keypads on the front surface. In this case, the keyboard image includes only a label projected on each specified location for indicating the function of each specified location.

In one embodiment, the wireless nodes convert freely available energy inherent in most operating environments into conditioned electrical power. Energy harvesting is defined as the conversion of ambient energy into usable electrical energy. When compared with the energy stored in common storage elements, like batteries and the like, the environment represents a relatively inexhaustible source of energy. Energy harvesters can be based on piezoelectric devices, solar cells or electromagnetic devices that convert mechanical vibrations.

Power generation with piezoelectrics can be done with body vibrations or by physical compression (impacting the material and using a rapid deceleration using foot action, for example). The vibration energy harvester consists of three main parts. A piezoelectric transducer (PZT) serves as the energy conversion device, a specialized power converter rectifies the resulting voltage, and a capacitor or battery stores the power. The PZT takes the form of an aluminum cantilever with a piezoelectric patch. The vibration-induced strain in the PZT produces an ac voltage. The system repeatedly charges a battery or capacitor, which then operates the EKG/EMG sensors or other sensors at a relatively low duty cycle. In one embodiment, a vest made of piezoelectric materials can be wrapped around a person's chest to generate power when strained through breathing as breathing increases the circumference of the chest for an average human by about 2.5 to 5 cm. Energy can be constantly harvested because breathing is a constant activity, even when a person is sedate. In another embodiment, piezoelectric materials are placed in between the sole and the insole; therefore as the shoe bends from walking, the materials bend along with it. When the stave is bent, the piezoelectric sheets on the outside surface are pulled into expansion, while those on the inside surface are pushed into contraction due to their differing radii of curvature, producing voltages across the electrodes. In another embodiment, PZT materials from Advanced Cerametrics, Inc., Lambertville, N.J. can be incorporated into flexible, motion sensitive (vibration, compression or flexure), active fiber composite shapes that can be placed in shoes, boots, and clothing or any location where there is a source of waste energy or mechanical force. These flexible composites generate power from the scavenged energy and harness it using microprocessor controls developed specifically for this purpose. Advanced Cerametric's viscose suspension spinning process (VSSP) can produce fibers ranging in diameter from 10 μm (⅟₅₀ of a human hair) to 250 μm and mechanical to electrical transduction efficiency can reach 70 percent compared with the 16-18 percent common to solar energy conversion. The composite fibers can be molded into user-defined shapes and is flexible and motion-sensitive. In one implementation, energy is harvested by the body motion such as the foot action or vibration of the PZT composites. The energy is converted and stored in a low-leakage charge circuit until a predetermined threshold voltage is reached. Once the threshold is reached, the regulated power is allowed to flow for a sufficient period to power the wireless node such as the Zigbee CPU/transceiver. The transmission is detected by nearby wireless nodes that are AC-powered and forwarded to the base station for signal processing. Power comes from the vibration of the system being monitored and the unit requires no maintenance, thus reducing life-cycle costs. In one embodiment, the housing of the unit can be PZT composite, thus reducing the weight.

In another embodiment, body energy generation systems include electro active polymers (EAPs) and dielectric elastomers. EAPs are a class of active materials that have a mechanical response to electrical stimulation and produce an electric potential in response to mechanical stimulation. EAPs are divided into two categories, electronic, driven by electric field, and ionic, driven by diffusion of ions. In one embodiment, ionic polymers are used as biological actuators that assist muscles for organs such as the heart and eyes. Since the ionic polymers require a solvent, the hydrated human body provides a natural environment. Polymers are actuated to contract, assisting the heart to pump, or correcting the shape of the eye to improve vision. Another use is as miniature surgical tools that can be inserted inside the body. EAPs can also be used as artificial smooth muscles, one of the original ideas for EAPs. These muscles could be placed in exoskeletal suits for soldiers or prosthetic devices for disabled persons. Along with the energy generation device, ionic polymers can be the energy storage vessel for harvesting energy. The capacitive characteristics of the EAP allow the polymers to be used in place of a standard capacitor bank. With EAP based jacket, when a person moves his/her arms, it will put the electro active material around the elbow in tension to generate power. Dielectric elastomers can support 50-100% area strain and generate power when compressed. Although the material could again be used in a bending arm type application, a shoe type electric generator can be deployed by placing the dielectric elastomers in the sole of a shoe. The constant compressive force provided by the feet while walking would ensure adequate power generation.

For wireless nodes that require more power, electromagnetics, including coils, magnets, and a resonant beam, and micro-generators can be used to produce electricity from readily available foot movement. Typically, a transmitter needs about 30 mW, but the device transmits for only tens of milliseconds, and a capacitor in the circuit can be charged using harvested energy and the capacitor energy drives the wireless transmission, which is the heaviest power requirement. Electromagnetic energy harvesting uses a magnetic field to convert mechanical energy to electrical. A coil attached to the oscillating mass traverses through a magnetic field that is established by a stationary magnet. The coil travels through a varying amount of magnetic flux, inducing a voltage according to Faraday's law. The induced voltage is inherently small and must therefore be increased to viably source energy. Methods to increase the induced voltage include using a transformer, increasing the number of turns of the coil, and/or increasing the permanent magnetic field. Electromagnetic devices use the motion of a magnet relative to a wire coil to generate an electric voltage. A permanent magnet is placed inside a wound coil. As the magnet is moved through the coil it causes a changing magnetic flux. This flux is responsible for generating the voltage which collects on the coil terminals. This voltage can then be supplied to an electrical load. Because an electromagnetic device needs a magnet to be sliding through the coil to produce voltage, energy harvesting through vibrations is an ideal application. In one embodiment, electromagnetic devices are placed inside the heel of a shoe. One implementation uses a sliding magnet-coil design, the other, opposing magnets with one fixed and one free to move inside the coil. If the length of the coil is increased, which increases the turns, the device is able to produce more power.

In an electrostatic (capacitive) embodiment, energy harvesting relies on the changing capacitance of vibration-dependant varactors. A varactor, or variable capacitor, is initially charged and, as its plates separate because of vibrations, mechanical energy is transformed into electrical energy. MEMS variable capacitors are fabricated through relatively mature silicon micro-machining techniques.

In another embodiment, the wireless node can be powered from thermal and/or kinetic energy. Temperature differentials between opposite segments of a conducting material result in heat flow and consequently charge flow, since mobile, high-energy carriers diffuse from high to low concentration regions. Thermopiles consisting of n- and p-type materials electrically joined at the high-temperature junction are therefore constructed, allowing heat flow to carry the dominant charge carriers of each material to the low temperature end, establishing in the process a voltage difference across the base electrodes. The generated voltage and power is proportional to the temperature differential and the Seebeck coefficient of the thermoelectric materials. Body heat from a user's wrist is captured by a thermoelectric element whose output is boosted and used to charge the a lithium ion rechargeable battery. The unit utilizes the Seeback Effect which describes the voltage created when a temperature difference exists across two different metals. The thermoelectric generator takes body heat and dissipates it to the ambient air, creating electricity in the process.

In another embodiment, the kinetic energy of a person's movement is converted into energy. As a person moves their weight, a small weight inside the wireless node moves like a pendulum and turns a magnet to produce electricity which can be stored in a super-capacitor or a rechargeable lithium battery. Similarly, in a vibration energy embodiment, energy extraction from vibrations is based on the movement of a "spring-mounted" mass relative to its support frame. Mechanical acceleration is produced by vibrations that in turn cause the mass component to move and oscillate (kinetic energy). This relative displacement causes opposing frictional and damping forces to be exerted against the mass, thereby reducing and eventually extinguishing the oscillations. The damping forces literally absorb the kinetic energy of the initial vibration. This energy can be converted into electrical energy via an electric field (electrostatic), magnetic field (electromagnetic), or strain on a piezoelectric material.

Another embodiment extracts energy from the surrounding environment using a small rectenna (microwave-power receivers or ultrasound power receivers) placed in patches or membranes on the skin or alternatively injected underneath the skin.

The rectanna converts the received emitted power back to usable low frequency/dc power. A basic rectanna consists of an antenna, a low pass filter, an ac/dc converter and a dc bypass filter. The rectanna can capture renewable electromagnetic energy available in the radio frequency (RF) bands such as AM radio, FM radio, TV, very high frequency (VHF), ultra high frequency (UHF), global system for mobile communications (GSM), digital cellular systems (DCS) and especially the personal communication system (PCS) bands, and unlicensed ISM bands such as 2.4 GHz and 5.8 GHz bands, among others. The system captures the ubiquitous electromagnetic energy (ambient RF noise and signals) opportunistically present in the environment and transforming that energy into useful electrical power. The energy-harvesting antenna is preferably designed to be a wideband, omnidirectional antenna or antenna array that has maximum efficiency at selected bands of frequencies containing the highest energy levels. In a system with an array of antennas, each antenna in the array can be designed to have maximum efficiency at the same or different bands of frequency from one another. The collected RF energy is then converted into usable DC power using a diode-type or other suitable rectifier. This power may be used to drive, for example, an amplifier/filter module connected to a second antenna system that is optimized for a particular frequency and application. One antenna system can act as an energy harvester while the other antenna acts as a signal transmitter/receiver. The antenna circuit elements are formed using standard wafer manufacturing techniques. The antenna output is stepped up and rectified before presented to a trickle charger. The charger can recharge a complete battery by providing a larger potential difference between terminals and more power for charging during a period of time. If battery includes individual micro-battery cells, the trickle charger provides smaller amounts of power to each individual battery cell, with the charging proceeding on a cell by cell basis. Charging of the battery cells continues whenever ambient power is available. As the load depletes cells, depleted cells are switched out with charged cells. The rotation of depleted cells and charged cells continues as required. Energy is banked and managed on a micro-cell basis.

In a solar cell embodiment, photovoltaic cells convert incident light into electrical energy. Each cell consists of a reverse biased pn+ junction, where light interfaces with the heavily doped and narrow n+ region. Photons are absorbed within the depletion region, generating electron-hole pairs. The built-in electric field of the junction immediately separates each pair, accumulating electrons and holes in the n+ and p-regions, respectively, and establishing in the process an open circuit voltage. With a load connected, accumulated electrons travel through the load and recombine with holes at the p-side, generating a photocurrent that is directly proportional to light intensity and independent of cell voltage.

As the energy-harvesting sources supply energy in irregular, random "bursts," an intermittent charger waits until sufficient energy is accumulated in a specially designed transitional storage such as a capacitor before attempting to transfer it to the storage device, lithium-ion battery, in this case. Moreover, the system must partition its functions into time slices (time-division multiplex), ensuring enough energy is harvested and stored in the battery before engaging in power-sensitive tasks. Energy can be stored using a secondary (rechargeable) battery and/or a supercapacitor. The different characteristics of batteries and supercapacitors make them suitable for different functions of energy storage. Supercapacitors provide the most volumetrically efficient approach to meeting high power pulsed loads. If the energy must be stored for a long time, and released slowly, for example as back up, a battery would be the preferred energy storage device. If the energy must be delivered quickly, as in a pulse for RF communications, but long term storage is not critical, a supercapacitor would be sufficient. The system can employ i) a battery (or several batteries), ii) a supercapacitor (or supercapacitors), or iii) a combination of batteries and supercapacitors appropriate for the application of interest. In one embodiment, a microbattery and a microsupercapacitor can be used to store energy. Like batteries, supercapacitors are electrochemical devices; however, rather than generating a voltage from a chemical reaction, supercapacitors store energy by separating charged species in an electrolyte. In one embodiment, a flexible, thin-film, rechargeable battery from Cymbet Corp. of Elk River, Minn. provides 3.6V and can be recharged by a reader. The battery cells can be from 5 to 25 microns thick. The batteries can be recharged with solar energy, or can be recharged by inductive coupling. The tag is put within range of a coil attached to an energy source. The coil "couples" with the antenna on the RFID tag, enabling the tag to draw energy from the magnetic field created by the two coils.

FIG. 4 shows an exemplary wearable appliance working with the phone of FIG. 1 to provide wrist monitoring of 360 degree video being captured. Data collected and communicated on the display 1382 of the watch as well as voice is transmitted to a base station 1390 for communicating over a network to an authorized party 1394. The watch and the base station is part of a mesh network that may communicate with a medicine cabinet to detect opening or to each medicine container 1391 to detect medication compliance. Other devices include mesh network thermometers, scales, or exercise devices. The mesh network also includes a plurality of home/room appliances 1392-1399. The ability to transmit voice is useful in the case the patient has fallen down and cannot walk to the base station 1390 to request help. Hence, in one embodiment, the watch captures voice from the user and transmits the voice over the Zigbee mesh network to the base station 1390. The base station 1390 in turn dials out to an authorized third party to allow voice communication and at the same time transmits the collected patient vital parameter data and identifying information so that help can be dispatched quickly, efficiently and error-free. In one embodiment, the base station 1390 is a POTS telephone base station connected to the wired phone network. In a second embodiment, the base station 1390 can be a cellular telephone connected to a cellular network for voice and data transmission. In a third embodiment, the base station 1390 can be a WiMAX or 802.16 standard base station that can communicate VOIP and data over a wide area network. In one implementation, Zigbee or 802.15 appliances communicate locally and then transmits to the wide area network (WAN) such as the Internet over WiFi or WiMAX. Alternatively, the base station can communicate with the WAN over POTS and a wireless network such as cellular or WiMAX or both.

The NFC 9 of FIG. 6B can serve the same function as the Zigbee to control home automation. The user can have flexible management of lighting, heating and cooling systems from anywhere in the home. The watch automates control of multiple home systems to improve conservation, convenience and safety. The mobile device can capture highly detailed electric, water and gas utility usage data and embed intelligence to optimize consumption of natural resources. The system is convenient in that it can be installed, upgraded and networked without wires. The patient can receive automatic notification upon detection of unusual events in his or her home. For example, if smoke or carbon monoxide detectors detect a problem, the wristwatch can buzz or vibrate to alert the user and the central hub triggers selected lights to illuminate the safest exit route.

In another embodiment, the mobile device serves a key fob allowing the user to wirelessly unlock doors controlled by NFC or Zigbee wireless receiver. In this embodiment, when the user is within range, the door NFC transceiver receives a request to unlock the door, and the NFC transceiver on the door transmits an authentication request using suitable security mechanism. Upon entry, the NFC doorlock device sends access signals to the lighting, air-conditioning and entertainment systems, among others. The lights and temperature are automatically set to pre-programmed preferences when the user's presence is detected.

Although NFC and Zigbee is mentioned as exemplary protocols, other protocols such as UWB, Bluetooth, WiFi and WiMAX can be used as well.

One embodiment supports paying at an NFC-enabled terminal, where the actual card number does not get transferred and malicious hackers won't be able to steal it. The transaction uses tokenization, which means that instead of real numbers, what's transmitted over the air are encrypted tokens. The other important security aspect is the Secure Element (SE). This is a separate and special chip inside the phone. It's special not just because it is dedicated to mobile payments: even its physical design is such that it is protected from hardware attacks. Each time a user starts a transaction, the SE assists in generating a random, one-time use code rather actual card numbers.

One embodiment provides MST transactions. A magnetic coil inside the phone runs alternating currents through an inductive loop and generates a dynamic magnetic field that a terminal can read. This exact magnetic field contains your payment information. The current appears for a very short period of time and secondly, it only spreads within 3-inch distance. These two factors make it hard to intercept this information, but for all else, this is just as secure as using a credit/debit card.

Figure 5A:
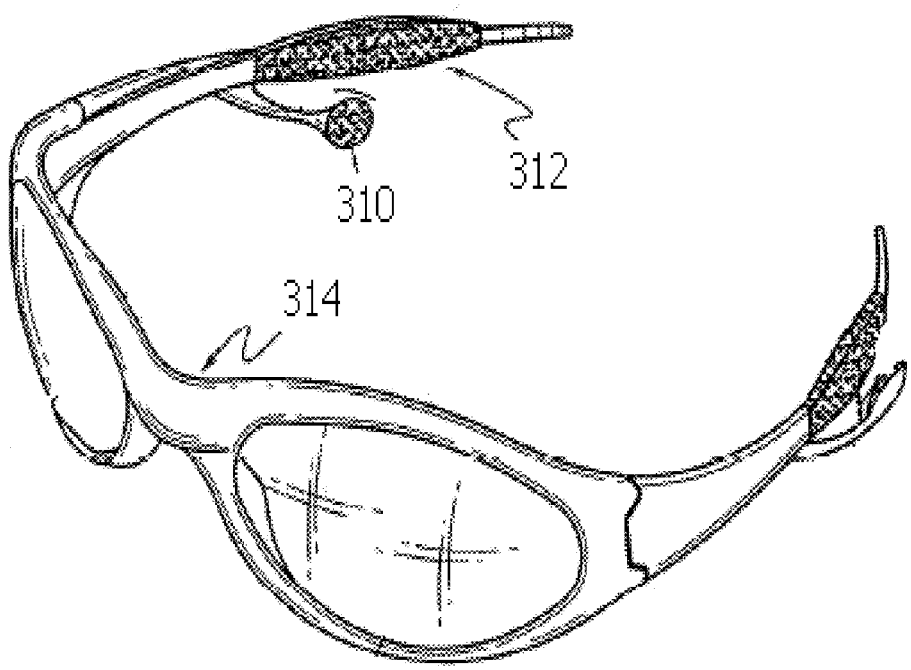
FIG. 5A shows a sunglass or eyeglass embodiment which contains electronics for communicating with the cellular and local wireless network.
Figure 5B:
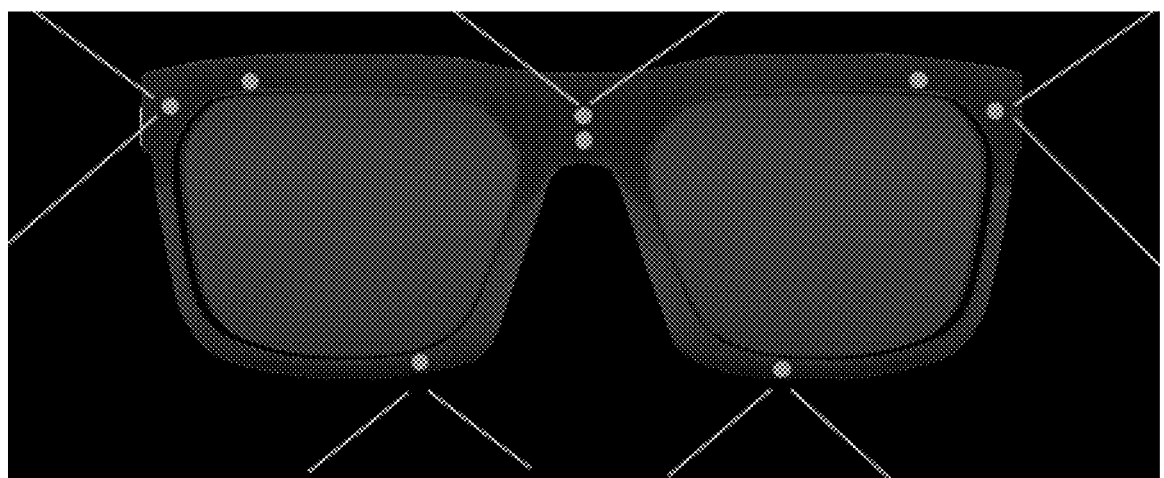
Figure 5C:
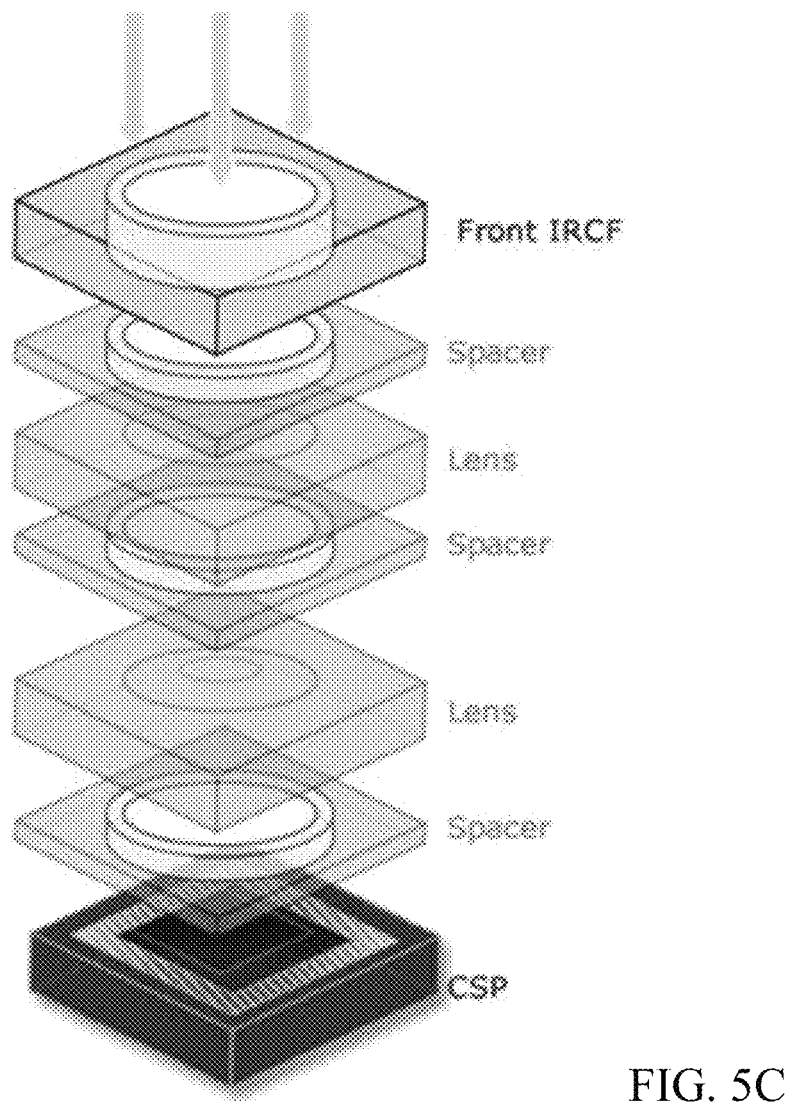
FIG. 5C shows an exemplary wafer level camera module used in FIGS. 5A-5B.

FIG. 5A shows a sunglass or eyeglass embodiment which contains electronics for communicating with the cellular and local wireless network. FIG. 5B shows exemplary placement of the multi-cameras, while FIG. 5C shows an exemplary wafer level camera module used in FIGS. 5A-5B. In this embodiment, a flexible LCD display is mounted above the eyeglass to superimpose data output from the processor and the cellular network connection. The superimposition of LCD display and viewing area is perfect for augmented reality applications. In this embodiment, a camera is positioned on the front of the eyeglass (between the two glasses) and the video feed is analyzed by processors in the eyeglass or processors located in the cloud server over the wireless network. The result of the analysis is sent back to the LCD display superimposed on the eyeglass. With augmented-reality displays, informative graphics will appear in the user's field of view, and audio will coincide with whatever the user sees. These enhancements will be refreshed continually to reflect the movements of the user's head. A projector can be mounted on the eyeglass to essentially turn any surface into an interactive screen. The device works by using the camera and mirror to examine the surrounding world, feeding that image to the phone (which processes the image, gathers GPS coordinates and pulls data from the Internet), and then projecting information from the projector onto the surface in front of the user, whether it's a wrist, a wall, or even a person. Because the user is wearing the camera on his eyeglass, the system can augment whatever he looks at; for example, if he picks up a can of soup in a grocery store, the system can find and project onto the soup information about its ingredients, price, nutritional value—even customer reviews.

With air gestures, a user can perform actions on the projected information, which are then picked up by the camera and processed by the phone. If he wants to know more about that can of soup than is projected on it, he can use his fingers to interact with the projected image and learn about, say, competing brands. The speaker can play digital audio file, which can be compressed according to a compression format. The compression format may be selected from the group consisting of: PCM, DPCM, ADPCM, AAC, RAW, DM, RIFF, WAV, BWF, AIFF, AU, SND, CDA, MPEG, MPEG-1, MPEG-2, MPEG-2.5, MPEG-4, MPEG-J, MPEG 2-ACC, MP3, MP3Pro, ACE, MACE, MACE-3, MACE-6, AC-3, ATRAC, ATRAC3, EPAC, Twin VQ, VQF, WMA, WMA with DRM, DTS, DVD Audio, SACD, TAC, SHN, OGG, Ogg Vorbis, Ogg Tarkin, Ogg Theora, ASF, LQT, QDMC, A2b, .ra, .rm, and Real Audio G2, RMX formats, Fairplay, Quicktime, SWF, and PCA, among others.

In one embodiment, the ear module 310 contains optical sensors to detect temperature, blood flow and blood oxygen level as well as a speaker to provide wireless communication or hearing aid. The blood flow or velocity information can be used to estimate blood pressure. The side module 312 can contain an array of bioimpedance sensors such as bipolar or tetrapolar bioimpedance probes to sense fluids in the brain. Additional bioimpedance electrodes can be positioned around the rim of the glasses as well as the glass handle or in any spots on the eyewear that contacts the user. The side module 312 or 314 can also contain one or more EKG electrodes to detect heart beat parameters and to detect heart problems. The side module 312 or 314 can also contain piezoelectric transducers or microphones to detect heart activities near the brain. The side module 312 or 314 can also contain ultrasound transmitter and receiver to create an ultrasound model of brain fluids. In one embodiment, an acoustic sensor (microphone or piezoelectric sensor) and an electrical sensor such as EKG sensor contact the patient with a conductive gel material. The conductive gel material provides transmission characteristics so as to provide an effective acoustic impedance match to the skin in addition to providing electrical conductivity for the electrical sensor. The acoustic transducer can be directed mounted on the conductive gel material substantially with or without an intermediate air buffer. In another embodiment, electronics components are distributed between first and second ear stems. In yet another embodiment, the method further comprises providing a nose bridge, wherein digital signals generated by the electronics circuit are transmitted across the nose bridge. The eyewear device may communicate wirelessly using the mesh network or alternatively they may communicate through a personal area network using the patient's body as a communication medium. Voice can be transmitted over the mesh wireless network.

In one embodiment, the eye wear device of FIG. 8 can provide a data port, wherein the data port is carried by the ear stem. The data port may be a mini-USB connector, a FIREWIRE connector, an IEEE 1394 cable connector, an RS232 connector, a JTAB connector, an antenna, a wireless receiver, a radio, an RF receiver, or a Bluetooth receiver. In another embodiment, the wearable device is removably connectable to a computing device. The wearable wireless audio device may be removably connectable to a computing device with a data port, wherein said data port is mounted to said wearable wireless audio device. In another embodiment, projectors can project images on the glasses to provide head-mounted display on the eye wear device. The processor can display fact, figure, to do list, and reminders need in front of the user's eyes.

In one embodiment, a method to provide user input to a mobile device having a camera therein, includes:

detecting a gesture formed by one or more body parts with the camera;

converting the detected gesture into a requested user input; and executing the requested user input and providing results to the user.

The method includes detecting a four-finger swipe from side to side in order to switch and open apps, swiping up with four fingers to open an application switcher, or using a five-finger pinch to return to a home screen. The method includes detecting a gesture with two or more fingers simultaneously in the air. The method includes detecting pinching or stretching gestures in the air to control zooming. The method includes waving a hand up or down in the air to scroll a display. The method includes moving a finger in the air to scroll a display. The method includes tapping a finger in the air to click. The method includes clicking or tapping with two fingers in the air to perform a secondary click. The method includes performing a double tap in the air to look up information. The method includes detecting gestures formed by one or more hands in the air to explain spatial ideas. The method includes tracing shapes with fingers in the air. The method includes capturing a user's gesture in the air with the camera. The includes detecting swiping with two or three fingers to move between pages of a document. The method includes swiping with three or four fingers to move between full-screen applications. The method includes displaying a launchpad by pinching in the air with thumb and three fingers. The method includes showing a desktop when a thumb and three fingers are spread in the air. The method includes detecting user intent based on gaze tracking. The method includes detecting eye movement to select a user interface item. The method includes detecting eye blink to select a user interface item. The method includes detecting eye movement and hand movement to perform a graphical user interface (GUI) control.

Figure 6:
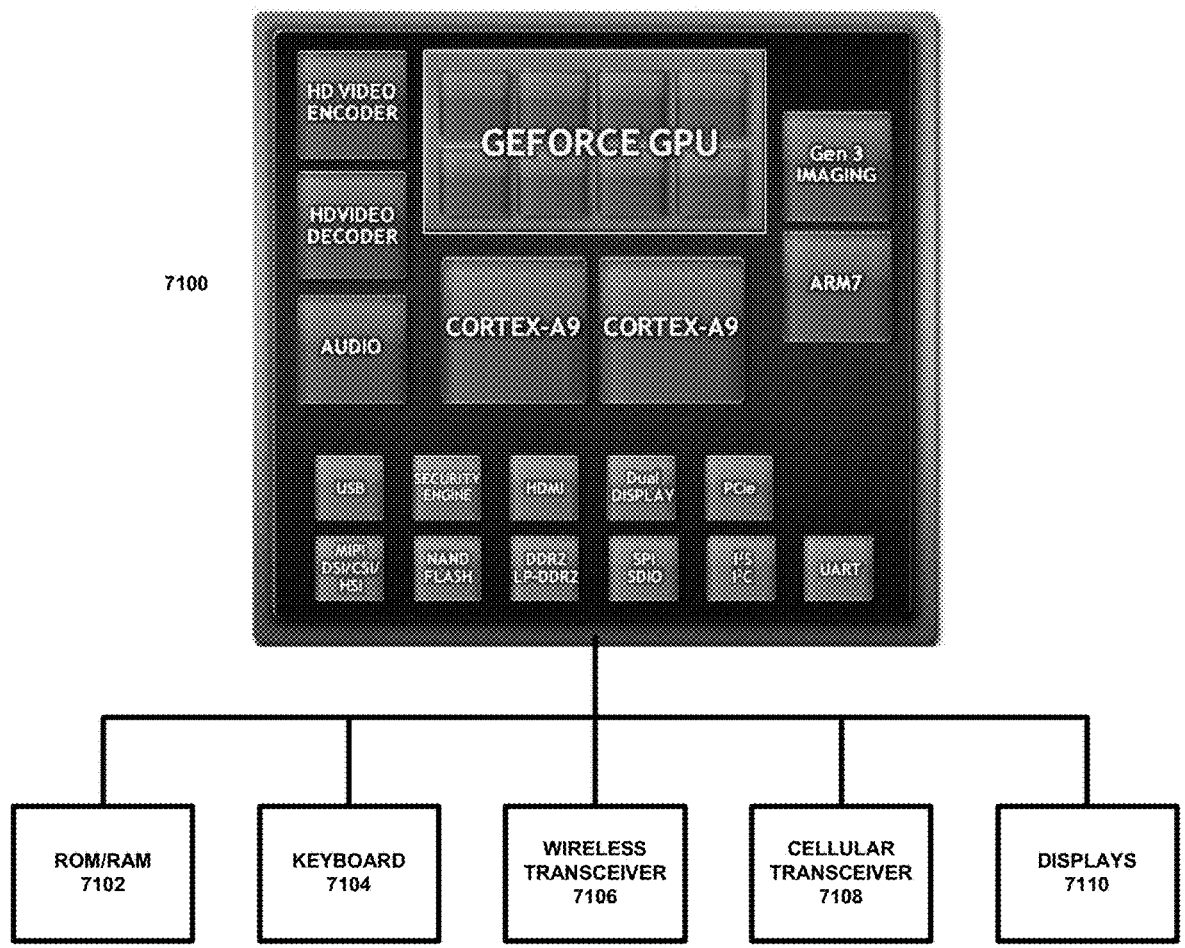
FIG. 6 shows another exemplary cellular telephone embodiment with GPU processing for immersive video handling.

FIG. 6 shows an exemplary phone hardware. In this system, a multi-core processor and graphic processing unit (GPU) device 7100 is used. The device 7100 is connected over a bus to memory 7102, keyboard 7104, wireless transceiver 7106, cellular transceiver 7108, and a plurality of display panels 7110. The memory 7102 can be flash memory that acts as a solid state disk drive for the workstation. In one embodiment, the keyboard 7104 is a physical keyboard (as opposed to a screen based keyboard) that provides tactile feedback to the user, the wireless transceiver 7106 is a WiFi or 802.XX type transceiver, the cellular transceiver 7108 is a 4G cellular modem, and the display panels 7110 are E-ink panels. Further, Near Field Communication (NFC) devices can be embedded into the digital wallet embodiment to support electronic commerce.

The device 7100 allows various processing tasks could be shared across the two cores. Due to task sharing, the cores don't need to run at full capacity and can be run at a lower frequency and voltage. Since the power consumption of semiconductor devices is proportional to the frequency and voltage-squared, even a small reduction in the operating frequency and voltage will result in significant reduction in power consumption. Therefore a mobile processor with a dual core CPU with SMP capabilities will often be more power efficient than a single core CPU based mobile processor. In one implementation, the device 7100 is a Tegra 2 from Nvidia with two processors, each a highly optimized version of the ARM® Cortex A9 MPcore™ architecture. However, additional cores such as quad-core and octa-core processors are contemplated.

The Symmetric Multiprocessing, out of order execution, and branch prediction features of the processor cores help deliver very fast Web page load times, snappy webpage rendering, and a smooth user interaction experience. The CPU cores are power managed through complex and highly intelligent Dynamic Voltage and Frequency Scaling algorithms. These algorithms are implemented at both the hardware and software level to ensure both cores are always operating at the optimal voltage and frequency levels to deliver the demanded performance, while consuming the lowest possible power. The multicore system is more power efficient and delivers higher performance per watt than competing solutions for the following reasons:

SMP technology can distribute and share task workloads across the two processing cores and thus each core is not fully loaded and does not have to run at peak capacity/speed. This enables the system level power management control logic to run the two cores at much lower operating frequency and voltage and thus achieve significant power savings for tasks that are highly parallel, device 100 is able to distribute the workload across the two CPU cores and complete the task much faster than a single core CPU solution.

Thus the dual core CPU would be able to complete a task quickly and enter into a low power state to conserve power, while a single core processor would have to be in an active high power state for longer periods of time to process the same task.

For low intensity workloads that only require the processing power of a single core, the other core can be turned off, reducing power consumption to almost the same level as that of a single core CPU. For example, if a Web page contains several scripts, streaming Flash video content, and script-based images, then in most cases, a single core CPU will be running at peak utilization, and to deliver peak performance, it will also be running at maximum operating voltage and frequency. For the same task running on a dual core CPU used in the SMP architecture, the Web browsing task is shared between the two processor cores. Therefore both cores need to run at only around 50% utilization to complete the task. Since the workload is shared, the cores can run at much lower voltage and frequency. Because each core processes only half the workload, each core can operate at almost half the frequency of the single core CPU, and therefore can run at a lower operating voltage. The device 100 is also optimized for playing Flash. Since Flash video playback and gaming involves graphics and pixel processing, the GPU core is better equipped to process these tasks efficiently and at high performance. In one embodiment, the OpenGL ES pipeline is fully leveraged to accelerate Flash-based graphics effect. A "style" describes how to render the inside of a Flash object on the screen. It could be a solid color, gradient fill, an image or video applied to the object, etc. The style also describes textures to apply, or which OpenGL ES vertex and pixel shaders to be used to achieve the desired rendering effect. Vertices are the basic building block of the 3D graphics pipeline, and are used to describe the outlines of the Flash objects. A variety of filter affects can be applied in a multi-pass process. Examples of filters include blurring an image, edge detection, applying highlights to an image, etc. Filter effects are implemented as fragment shaders, and also rendered with the GPU using OpenGL ES. Some complex scenes can be made up of more than 10 filter effects. The result of the rendering step is the final image, still stored in GPU memory. If capable, the browser can pull the image straight from GPU memory for further compositing into the web page. That compositing can also be done by the GPU, which will be an additional performance benefit.

In the video acceleration path in Flash, a video file first gets parsed and stored as a coded video stream inside a Flash player buffer. The coded video stream is then transferred to a hardware buffer where dedicated video hardware will process it, and produce a YUV image for each video frame. As the final rendering is always in RGB, the YUV image is converted to RGB color space by another hardware block. The resulting series of RGB images can simply be used as another rendering style, and rendered using OpenGL as textured quads.

Similar to Adobe Flash content processing, touch interactions trigger a significant amount of pixel processing, and most of the pixel processing for the user interface (UI) in current operating systems is performed by the CPU. Therefore to deliver fluid and snappy UI responsiveness even under heavy multi-tasking conditions, mobile processors must either have sufficient headroom in CPU processing power, or offload some of the UI-related pixel processing to a GPU core that is optimized to handle such tasks.

In one implementation, a method for increasing mobile processing power on a mobile device with a general purpose processor and one or more graphic processing units (GPUs) to accelerate graphic rendering on a screen includes separating general purpose software into parallelizable portions; running one or more parallelizable portions on one or more GPUs; and collecting GPU results.

The system can use GPUs for recognition of gestures in the air.

The system can use GPUs for eye tracking on the phone.

The system can use GPUs for electrocardiogram analysis on the phone.

The system can use GPUs for augmented reality on the phone.

The system can use GPUs for Doppler radar processing on the phone.

In one embodiment, the system can do on-the-fly augmented reality processing. For example, the system can auto translate signs from one language to another. First, the GPU identifies the letters on the sign. Next, it calculates their rotation and the perspective from which the viewer is seeing them. Then it tries to recognize each letter by consulting a library of reference font sets. A string of letters is generated, and a probabilistic word recognition is done. Upon recognizing the word, the system generates a synthetic version with the translation in the sign. The original language is erased and the existing orientation, foreground, and background color, which may be a gradient [rather than a constant color] are used to put new text on top.

In another embodiment, the computer (with or without the GPU) can work with eye gazing as a form of user input. In one embodiment, a method to provide user input to a mobile device having a camera therein to capture eye movements includes tracking eye movement to detect a user request;
converting the user request into a requested user input; and
executing the requested user input and providing results to the user.

The system can determine user intent based on gaze tracking. The system can detect eye movement to select a user interface item. The system can detect eye blink to select a user interface item. The system can detect eye movement and hand movement to perform a graphical user interface (GUI) control. The system can calibrate the camera by taking a picture of a left or right eye. The system includes calibrating the eye indoors and outdoors. The system can identify a person's eye at predetermined distances and under different lighting conditions during a learning phase. The system can track an eye position relative to a screen rather than where a person is looking. The system can form a virtual box around an image of the eye, and recognize the eye inside the virtual box. The system can divide a camera image into a plurality of regions and locating the eye in one region. The system can authenticate the user with the eye movement. The system can detect eye movements following a moving icon around a screen. The system can detect one or more kinetic features unique to the user. During training, the system can move an icon across a screen to elicit distinct characteristics associated with the user. The icon can be moved rapidly to activate a predetermined sequence of eye movements; the icon can be moved smoothly or slowly to activate a second predetermined sequence of eye movements; and the eye movements are captured by the camera. The system can detect a four-finger swipe from side to side in order to switch and open apps, swiping up with four fingers to open an application switcher, or using a five-finger pinch to return to a home screen. The system can detect a gesture with two or more fingers simultaneously in the air. The method includes one of:

detecting pinching or stretching gestures in the air to control zooming;
waving a hand up or down in the air to scroll a display or moving a finger in the air to scroll a display;
tapping a finger in the air to click;
clicking or tapping with two fingers in the air to perform a secondary click;
performing a double tap in the air to look up information;
detecting gestures formed by one or more hands in the air to explain spatial ideas;
tracing shapes with fingers in the air;
swiping with two or three fingers to move between pages of a document;
swiping with three or four fingers to move between full-screen applications;
displaying a launchpad by pinching in the air with thumb and three fingers; or
showing a desktop when a thumb and three fingers are spread in the air.

In one embodiment, a method for transportation ticketing check-in includes prompting a traveler to place a handheld device within range of a near field communication (NFC) reader; retrieving ticketing and traveler identification information from the handheld device via the NFC reader; and verifying the traveler's identity using the retrieved traveler identification and historical geo-location of the traveler and the current position of the traveler. The method includes verifying the traveler's identity includes comparing a photograph retrieved from the handheld device to the traveler.

The method includes verifying the traveler's identity includes downloading a photograph of the traveler from a database using an identification code retrieved from the handheld device.

The method includes verifying the traveler's identity includes: downloading a fingerprint from a database using an identification code retrieved from the handheld device; and comparing the downloaded fingerprint to a scanned fingerprint provided by the traveler at check-in.

The method includes verifying the traveler's identity includes: downloading a first retinal scan from a database using an identification code retrieved from the handheld device; and comparing the downloaded first retinal scan to a second retinal scan provided by the traveler at check-in.

The method includes prompting the traveler to place the handheld device within range of the NFC reader again after successfully checking in; and updating the ticketing information on the handheld device to indicate that the traveler checked in successfully.

The method includes updating the ticketing information includes storing information about checked luggage on the handheld device.

The ticketing information includes a reservation for a flight, car rental, cruise, train, bus, or a combination thereof.

In one implementation, the method includes providing credit to a user for digital content in response to information from a tag associated with a product or service scanned by an electronic device, wherein the information includes an identification number associated with the product or service and wherein the credit may be exchanged for digital content from an online digital content service.

The tag includes a radio frequency identification tag and the credit is provided after the radio frequency identification tag is scanned by a near field communication interface of the electronic device, wherein the electronic device is a personal device belonging to the user.

The tag includes a radio frequency identification tag and the credit is provided after the radio frequency identification tag is scanned by a near field communication interface of the electronic device, wherein the electronic device is a kiosk.

Tag can be a matrix barcode and the credit is provided after the matrix barcode is scanned by a camera of the electronic device, wherein the electronic device is a personal device belonging to the user.

The tag includes a matrix barcode and the credit is provided after the matrix barcode is scanned by a matrix barcode scanner of the electronic device, wherein the electronic device is a kiosk.

A method includes providing a tag associated with a product or service, wherein the tag is configured to enable an electronic device to obtain information associated with at least one benefit related to the product or service, wherein the at least one benefit includes at least one digital content credit, wherein the at least one digital content credit is configured to be exchanged for digital content related to the at least one benefit from an online digital content service.

The product or service includes a product manual and wherein the at least one benefit related to the product or service includes troubleshooting assistance and the at least one digital content credit is configured to be applied to a download of instructional audio or video; wherein the at least one benefit related to the product or service includes an offer for another product or service and the at least one digital content credit is configured to be applied to a purchase of the other product or service; wherein the at least one benefit related to the product or service includes an offer for software and the at least one digital content credit is configured to be applied to a purchase of the software; wherein the at least one benefit related to the product or service includes an offer for a peripheral device and the at least one digital content credit is configured to be applied to a purchase of the peripheral device; wherein the at least one benefit related to the product or service includes offers for digital media downloads and the at least one digital content credit is configured to be applied to a purchase of the digital media downloads; or any combination thereof.

The product or service includes a magazine, magazine insert, or mailer, and wherein the at least one benefit related to the product or service includes a movie trailer and the at least one digital content credit is configured to be applied to a download of the movie trailer; wherein the at least one benefit related to the product or service includes an offer for a discounted product and the at least one digital content credit is configured to be applied to a purchase of the discounted product; wherein the at least one benefit related to the product or service includes a video advertisement and the at least one digital content credit is configured to be applied to a download of the video advertisement; wherein the at least one benefit related to the product or service includes a video game or software demonstration and the at least one digital content credit is configured to be applied to a download of the video game or software demonstration; wherein the at least one benefit related to the product or service includes free or discounted music or media and the at least one digital content credit is configured to be applied to a download of the free or discounted music or media; or any combination thereof.

The product or service includes a textbook and wherein the at least one benefit related to the product or service includes supplementary problems and the at least one digital content credit is configured to be applied to a download of the supplementary problems; wherein the at least one benefit related to the product or service includes answers to textbook problems and the at least one digital content credit is configured to be applied to a download of the answers to the textbook problems; wherein the at least one benefit related to the product or service includes instructional audio or video and the at least one digital content credit is configured to be applied to a download of the instructional audio or video; wherein the at least one benefit related to the product or service includes an offer for related study materials and the at least one digital content credit is configured to be applied to a purchase of the related study materials; wherein the at least one benefit related to the product or service includes further recommended reading and the at least one digital content credit is configured to be applied to a purchase of a related book or article; or any combination thereof.

The product or service includes a novel or non-fiction book and wherein the at least one benefit related to the product or service includes an author interview and the at least one digital content credit is configured to be applied to a download of the author interview; wherein the at least one benefit related to the product or service includes an offer for a related title and the at least one digital content credit is configured to be applied to a purchase of the related title; wherein the at least one benefit related to the product or service includes a movie trailer associated with the book and the at least one digital content credit is configured to be applied to a download of the movie trailer; wherein the at least one benefit related to the product or service includes press discussing the book and the at least one digital content credit is configured to be applied to a download of the press; or any combination thereof.

The product or service includes music or movie packaging and wherein the at least one benefit related to the product or service includes a movie trailer and the at least one digital content credit is configured to be applied to a download of the movie trailer; wherein the at least one benefit related to the product or service includes a review of the music or movie and the at least one digital content credit is configured to be applied to a download of the review; wherein the at least one benefit related to the product or service includes a free single and the at least one digital content credit is configured to be applied to a download of the free single; or any combination thereof.

The product or service includes software or video game packaging and wherein the at least one benefit related to the product or service includes a demonstration version of software sold in the software or video game packaging and the at least one digital content credit is configured to be applied to a download of the demonstration version of the software; wherein the at least one benefit related to the product or service includes a preview video of the software sold in the software or video game packaging and the at least one digital content credit is configured to be applied to a download of the preview video; wherein the at least one benefit related to the product or service includes a video describing how the software sold in the software or video game packaging was made and the at least one digital content credit is configured to be applied to a download of the video; wherein the at least one benefit related to the product or service includes hints or troubleshooting and the at least one digital content credit is configured to be applied to a download of troubleshooting audio or video; wherein the at least one benefit related to the product or service includes an instructional video and the at least one digital content credit is configured to be applied to a download of the instructional video; or any combination thereof.

The product or service includes grocery product packaging and wherein the at least one benefit related to the product or service includes related recipes and the at least one digital content credit is configured to be applied to a download of audio or video for the related recipes; wherein the at least one benefit related to the product or service includes an instructional video and the at least one digital content credit is configured to be applied to a download of the instructional video; or any combination thereof.

The product or service includes a restaurant menu or store exterior and wherein the at least one benefit related to the product or service includes advertising content and the at least one digital content credit is configured to be applied to a download of advertising audio or video; wherein the at least one benefit related to the product or service includes a dinner special and the at least one digital content credit is configured to be applied to a purchase of the dinner special; wherein the at least one benefit related to the product or service includes nutrition information and the at least one digital content credit is configured to be applied to a download of the nutrition information; wherein the at least one benefit related to the product or service includes an event calendar and the at least one digital content credit is configured to be applied to a download of the event calendar; wherein the at least one benefit related to the product or service includes discounted or prepaid food or merchandise and the at least one digital content credit is configured to be applied to a purchase of the discounted or prepaid food or merchandise; or any combination thereof.

The product or service includes food product packaging and wherein the at least one benefit related to the product or service includes free or discounted music and the at least one digital content credit is configured to be applied to a download of the free or discounted music; wherein the at least one benefit related to the product or service includes an option to buy a song currently playing in a restaurant pertaining to the food product packaging and the at least one digital content credit is configured to be applied to a purchase of the song currently playing in the restaurant; wherein the at least one benefit related to the product or service includes prepaid or discount food or drink and the at least one digital content credit is configured to be applied to a purchase of the prepaid food or drink; wherein the at least one benefit related to the product or service includes nutrition information and the at least one digital content credit is configured to be applied to a download of the nutrition information; wherein the at least one benefit related to the product or service includes a game piece or game software and the at least one digital content credit is configured to be applied to a download of the game piece or game software; wherein the at least one benefit related to the product or service includes advertisements for related food products and the at least one digital content credit is configured to be applied to a download of audio or video advertisements for the related food products; or any combination thereof.

The method includes marketing a benefit package comprising one or more benefits associated with a product or service to a manufacturer, supplier, distributor, or retailer of the product or service, wherein the one or more benefits associated with the product or service are configured to be accessible via an electronic device, wherein the electronic device is configured to provide a user of the electronic device with digital content related to the benefits associated with the product or service when a tag associated with the product or service is scanned by the electronic device, and wherein marketing the benefit package includes recommending the one or more benefits related to the product or service.

The marketing the benefit package can include recommending the one or more benefits related to the product or service based on the type of the product or service.

The product or service includes a product manual and the recommending the one or more benefits related to the product or service includes recommending a benefit of troubleshooting assistance; an instructional video; contact information of a provider of the product or service; offers for products; offers for software; offers for peripheral devices; offers for digital media downloads; or any combination thereof.

The product or service includes a magazine, magazine insert, or mailer, and the recommending the one or more benefits related to the product or service includes recommending a benefit of a movie trailer; offers for discounted products; video advertisements; video game or software demonstrations; free or discounted music or media; or any combination thereof.

The product or service includes a textbook and the recommending the one or more benefits related to the product or service includes recommending a benefit of supplementary problems; answers to textbook problems; instructional audio or video; a link to purchase related study materials; further recommended reading; or any combination thereof.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware embodiments configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware embodiments or a combination of software and specific hardware embodiments are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the inventions have been described in detail, it may be understood that the various changes, substitutions, and alterations could be made hereto without departing from the spirit and scope of the invention.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A communication device, comprising: a processor; a cellular transceiver coupled to the processor; an imager with multiple lens and multiple sensors therein to capture a 360-degree video, the imager mounted on an eyeglass or head mounted display; a plurality of graphic processing units to combine outputs from the sensors to form the 360-degree video; a fingerprint sensor to authenticate the video; and a fiber optic collimator OLED display on the eyeglass or head mounted display.

2. The device of claim 1, comprising a virtual reality device housing or an augmented reality device housing.

3. The device of claim 1, comprising a plurality of removable lens coupled to a device housing, each lens having a sensor to capture images.

4. The device of claim 1, comprising a watch wirelessly coupled to the imager to display videos being recorded.

5. The device of claim 1, comprising a coil to transmit a magnetic field to a credit card reader.

6. The device of claim 1, comprising code for receiving video data comprising image frames from the sensors; stitching the image frames together and generating three-dimensional video; synthesizing audio data; and generating a stream of the three-dimensional video and the audio data.

7. The device of claim 1, comprising a cloud-based storage to receive the video.

8. The device of claim 1, comprising a light projector coupled to the processor to project the video onto a surface.

9. The device of claim 1, comprising code to recognize gesture commands to start, stop, zoom, or transition a scene.

10. The device of claim 1, comprising an eyeglass housing enclosing at least the processor, cellular transceiver, and imager.

11. The device of claim 1, wherein the imager comprises two lenses facing opposite directions to capture 360-degree views.

12. The device of claim 1, wherein the imager comprises two lenses facing opposite directions to capture 360-degree views.

13. The device of claim 1, wherein the imager comprises three or more lenses facing various directions to capture virtual reality views.

14. The device of claim 1, wherein each sensor is positioned to have at least one overlapping field of view with another sensor.

15. The device of claim 1, comprising a remote camera in wireless communication with the processor and synchronized to take the same view from a different perspective.

16. The device of claim 1, wherein GPUs combine the views from the imager and the remote camera.

17. The device of claim 1, wherein image frames are stitched together based on a relative position of each sensor.

18. The device of claim 1, wherein sensor outputs are processed to form one or more touchless sensors.

19. The device of claim 18, comprising code for eye tracking, hand tracking, body tracking, head tracking, object tracking, mouth tracking, environment tracking.

* * * * *